(12) United States Patent
Ishiguro et al.

(10) Patent No.: US 12,510,443 B2
(45) Date of Patent: Dec. 30, 2025

(54) MAKE-UP/BREAK-OUT EVALUATION METHOD FOR THREADED JOINT FOR OIL COUNTRY TUBULAR GOODS

(71) Applicant: JFE STEEL CORPORATION, Tokyo (JP)

(72) Inventors: Yasuhide Ishiguro, Tokyo (JP); Catalin Dobre, Houston, TX (US); Masaki Yoshikawa, Tokyo (JP); Seigo Goto, Tokyo (JP); Tetsuro Sawaki, Houston, TX (US); Takamasa Kawai, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 352 days.

(21) Appl. No.: 18/281,636

(22) PCT Filed: Mar. 8, 2022

(86) PCT No.: PCT/JP2022/010025
§ 371 (c)(1),
(2) Date: Sep. 12, 2023

(87) PCT Pub. No.: WO2022/196447
PCT Pub. Date: Sep. 22, 2022

(65) Prior Publication Data
US 2025/0084709 A1     Mar. 13, 2025

Related U.S. Application Data

(60) Provisional application No. 63/161,122, filed on Mar. 15, 2021.

(51) Int. Cl.
*G01M 99/00* (2011.01)
*E21B 17/042* (2006.01)
(Continued)

(52) U.S. Cl.
CPC ......... *G01M 99/007* (2013.01); *E21B 17/042* (2013.01); *G01M 13/00* (2013.01);
(Continued)

(58) Field of Classification Search
CPC .. G01M 13/00; G01M 99/007; G01M 99/008; G01M 5/0025; E21B 17/042; E21B 47/007; G01N 3/00; G01N 2203/0274
See application file for complete search history.

(56) References Cited

U.S. PATENT DOCUMENTS

2013/0019690 A1   1/2013   Akamatsu et al.
2019/0010767 A1   1/2019   Goto

FOREIGN PATENT DOCUMENTS

CN        2800263 Y   *   7/2006   ............... G01N 3/56
JP        2002-061780 A       2/2002
(Continued)

OTHER PUBLICATIONS

Jun. 27, 2024 Extended Search Report issued in European Patent Application No. 22771199.1.
(Continued)

*Primary Examiner* — Benjamin R Schmitt
(74) *Attorney, Agent, or Firm* — Oliff PLC

(57) ABSTRACT

A make-up/break-out evaluation method that makes it possible to evaluate the seizure resistance of a threaded joint for oil country tubular goods accurately without performing a test using a threaded joint with an actual length. When performing test with respect to the threaded joint for oil country tubular goods formed by attaching a pin lower portion to box upper portion with its axis directed vertically, a test pin formed by a pin shorter than an evaluation target pin used as test pin; a weight attached to test pin upper portion; mass of the weight is equal to or greater than a mass obtained by subtracting the test pin mass from the evaluation (Continued)

target pin mass; an initial set position for test pin is set where test pin five crests or ¼ of all test pin crests, whichever is greater, or more are exposed from the box upper end face.

20 Claims, 14 Drawing Sheets

(51) Int. Cl.
  *G01M 13/00* (2019.01)
  *G01N 3/00* (2006.01)
  *E21B 47/007* (2012.01)
  *G01M 5/00* (2006.01)

(52) U.S. Cl.
  CPC ............ *G01M 99/008* (2013.01); *G01N 3/00* (2013.01); *E21B 47/007* (2020.05); *G01M 5/0025* (2013.01); *G01N 2203/0274* (2013.01)

(56) References Cited

FOREIGN PATENT DOCUMENTS

| | | |
|---|---|---|
| JP | 2002-327874 A | 11/2002 |
| WO | 2017/110686 A1 | 6/2017 |

OTHER PUBLICATIONS

API RP 5C5 Latest Edition (4th Edition, Jan. 2017), "Procedures for Testing Casing and Tubing Connections."
Tsuru et al., "Performance Properties of Tubular Connection Under Hostile Well Conditions and Optimum Make-Up Procedure," Journal of Japanese Association for Petroleum Technology, Jul. 1996, vol. 61, No. 6, pp. 527-536.
May 24, 2022 International Search Report issued in International Patent Application No. PCT/JP2022/010025.
Sep. 12, 2023 International Preliminary Report on Patentability issued in International Patent Application No. PCT/JP2022/010025.

\* cited by examiner

FIG. 11A
FIG. 11B
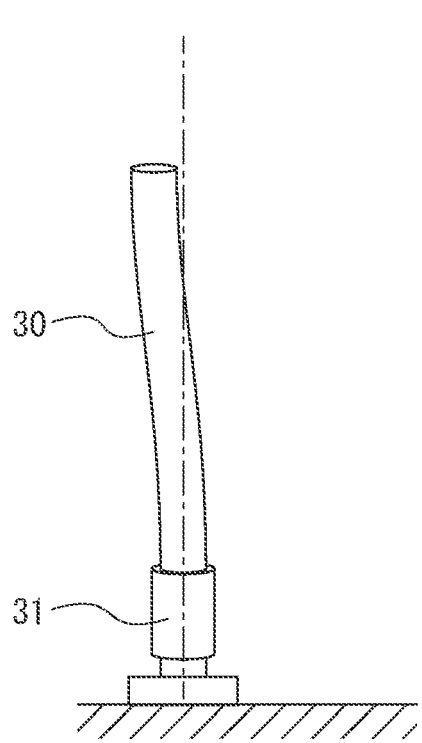
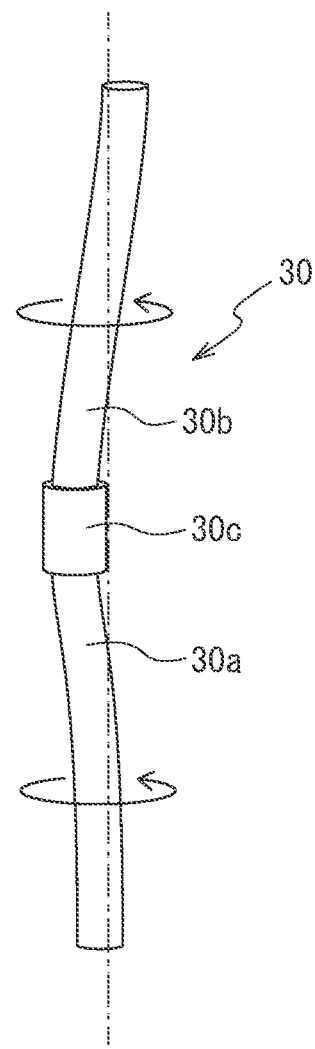

MAKE-UP/BREAK-OUT EVALUATION METHOD FOR THREADED JOINT FOR OIL COUNTRY TUBULAR GOODS

TECHNICAL FIELD

The present disclosure is a technology relating to a make-up/break-out evaluation method for a threaded joint for oil country tubular goods that is performed when evaluating the seizure resistance at the time of make-up/break-out of the threaded joint for oil country tubular goods.

In this description, there are cases where a pipe having a female thread will be collectively referred to as a box. That is, a coupling will also be described as one type of box.

BACKGROUND ART

With respect to a threaded joint for oil country tubular goods, the design of the threaded joint and the seizure resistance of the threaded joint are evaluated through a make-up/break-out test (Make & Break test) using power tongs. The seizure resistance is evaluated as to whether or not a surface treatment and a lubrication condition of the threaded joint are properly set.

The seizure resistance of the threaded joint for oil country tubular goods is described in the API 5C5 standard. In the API 5C5 standard, it is required that, in the case of a casing size, two times of make-up/break-out and final make-up, i.e. make-up up to three times, can be performed. On the other hand, it is required that, in the case of a tubing size, nine times of make-up/break-out and final make-up, i.e. make-up up to ten times, can be performed. Hereinafter, "make-up/break-out" will also be referred to as "Make & Break".

Evaluation of the surface treatment and lubrication of a joint portion at the time of make-up of the threaded joint for oil country tubular goods is performed as follows, for example. That is, in the case where the threaded joint is a T & C (Threaded and Coupled) type threaded joint, when a raw pipe is carbon steel based, a Mn phosphate chemical conversion coating, for example, is formed on the coupling side (box side) and thread cutting is left as it is on the pin side or shot blast is applied to the surface thereof for the evaluation described above. Then, a compound is applied to the surface on at least one of the coupling side and the pin side, and thereafter, a make-up/break-out test is performed to evaluate the occurrence of seizure. On the other hand, when a raw pipe is stainless steel based or high alloy based such as a Ni-based alloy, the evaluation is performed by forming, for example, electroplating on a coupling (box), applying a compound in the same way as described above, and performing a make-up/break-out test. The electroplating is formed by a layer of Cu plating or other metal plating, for example.

On the other hand, in the case where the threaded joint is an integral type threaded joint, chemical conversion coating or electroplating for lubrication is applied to at least one of threaded joints and a compound is applied to the threaded joint or the threaded joints on one side or both sides for the evaluation described above. Then, a make-up/break-out test is carried out to perform the evaluation. Herein, the integral type threaded joint is a threaded joint of the type in which connection is achieved with one side of a pin serving as a male thread and the other side of the pin serving as a female thread, without using a coupling like a semi-flush threaded joint or a flush threaded joint.

Herein, in the case of a casing, the length of an actual pin is 25 to 34 feet (7.62 m to 10.36 m) in Range-2 and 34 to 48 feet (10.36 m to 14.63 m) in Range-3, for example. In the case of a tubing, the length of an actual pin is 28 to 32 feet (8.53 m to 9.75 m) in Range-2 and 38 to 42 feet (11.58 m to 12.80 m) in Range-3, for example.

Assuming that the make-up/break-out test is performed using such a pin with the actual length, when evaluating the adequacy of the design of the threaded joint and the surface treatment and lubrication of the threaded joint, the evaluation is performed in a state closer to a condition of actual use. However, in this case, there is a problem that facilities where the test can be done are limited. Further, there is a problem that the longer the pin, the more cost and time are required. Further, there is actually no case where some newly developed connection member (pin or the like) is brought to an actual well and used without performing a lab verification test.

Therefore, there are cases where a so-called short pin (Pup Joint), machined to a length of about 1 m, is produced and a make-up/break-out test is performed using the produced short pin, thereby evaluating whether or not the pin and so on meet the criteria of the seizure resistance described above.

Herein, as the make-up/break-out test, there are a horizontal type test in which the axes of pipes (pipes) for the test are aligned horizontally, and a vertical type test in which the axes of pipes for the test are aligned vertically.

The horizontal type test described above is a test that purely evaluates the seizure resistance between a female thread (example: a thread portion of a coupling) and a male thread (example: a treaded portion of a pin). The horizontal type test is a test that evaluates the seizure resistance under ideal conditions in which there is almost no misalignment (misalignment (Misalignment) in the XY plane) of the axes of the female thread and the male thread.

On the other hand, in the vertical type test, the self-weight of a short pin is applied to a female thread (example: a thread portion of a coupling). The vertical type test is a test in which make-up/break-out is performed in the state where, in the case of, for example, a 1 m short pin of 9⅝"×53.5 #, a load of about 80 kg is applied to a female thread (example: a thread portion of a coupling) being set below. In the case of the vertical type test, in the initial set position, the state is such that the pin is set in an upper portion of the coupling from the upper side. Therefore, the axis center positions of the coupling and the pin cannot always be set to coincide with each other. That is, as illustrated in FIG. 14B, in the vertical type test, there is a tendency in the initial setting that the pin is subjected to misalignment of its axis in the horizontal plane and is in a state of oblique setting in the thread advancing direction, resulting in that the center axis of a short pin 40 is misaligned with respect to a box 41. FIG. 14A illustrates a state where the center axes of the box 41 and the short pin 40 coincide with each other. Therefore, make-up is performed such that it starts from the eccentric state and converges in a direction to make the axis centers coincide with each other. In this case, it cannot be avoided that the connection is made up while locally abutting hard on each other.

As illustrated in FIG. 13A, as the short pin 40 increases in length, the tendency also increases that the axis of the short pin 40 is set to be oblique at a predetermined angle θ with respect to the box 41. As illustrated in FIG. 13B, as the short pin 40 increases in length, there is also a tendency that the axis of the short pin 40 is bent more.

Therefore, in the vertical type test, high load is locally applied to the female thread of the box 41, including that the self-weight of the short pin is locally applied to the female thread. Therefore, the test becomes severe. For this reason, it has been general perception that evaluation by the vertical type test is important.

However, there has been a problem that even when a pass is determined in a vertical type test using a short pin, the seizure often occurs in a joint portion when a make-up/break-out test is performed using a pin with an actually used length or when applied in an actual well (site). In particular, such a problem is outstanding in a test (evaluation) of new connection design, new surface treatment coating, new lubrication coating, or the like.

Herein, PTL 1 describes that an axial misalignment (angular misalignment) tends to occur in the first make-up, and describes an evaluation of the seizure resistance based on such an assumption. That is, PTL 1 describes an evaluation based on the assumption of an axial misalignment with an inclination of about 10 degrees, for example. This is also a kind of severe test condition.

However, the inclination of the axis of the pin by as much as 10 degrees is unlikely to occur in the state where crest of the joint are engaged, even taking into account the taper of a connection for oil country tubular goods. The inclination of the axis at such an angle is on a level that is only realized in a partial contact state where the thread portion is not exactly engaged so that the pin is merely inclined. In addition, such a condition is far from the actual well condition and corresponds to a case where cross threading is caused, for example. The cross threading means that the threads are made up with a misalignment of one step from the original position.

Therefore, the test described in PTL 1 is a test that is far different from the use in the actual well. Alternatively, the test described in PTL 1 is a test in the partial contact state before the engagement of the crest in the first make-up.

Further, even if the make-up test is performed by providing the significant inclination at first, the thread of the pin, while engaging with the thread of the coupling, moves to the normal position with its axis standing upright. Therefore, providing the inclination of 10 degrees at the beginning of the make-up cannot be thought to be a meaningful test condition.

On the other hand, there is also a method of performing a make-up/break-out test by connecting a plurality of short pins to achieve a length corresponding to less than an actual length of an evaluation target pin. This is a method of performing the test while connecting vertically three to four short pins each of 3 m class (about 10 ft), for example. In the case of achieving the length corresponding to the pin (corresponding to a length <12 m; <40 ft) while performing making up (Make-up) per short pin, the difficulty of lifting the pin is solved. However, whether or not even a test in the state where the mass corresponding to the pin is applied can be reproduced is determined by the height of a ceiling of a test site. Further, the rigidity of the pin for test is increased corresponding to the presence of couplings, connecting the short pins, at intermediate portions in the axial direction. Then, corresponding thereto, there is a tendency that the connected short pins are set straight with respect to a box. Therefore, in this case, it cannot be said that a simulation is performed in which the self-weight of the pin is locally applied to a female thread portion of the box inevitably, taking into account that the axis of the actual pin tends to be slightly bent.

NPL 2 describes an example of performing a make-up/break-out test by disposing a weight of 5 kN (=510 kg weight) as a deadweight (Deadweight) right above a pin in order to study the influence of the self-load of a casing on make-up torque behavior. In the example described in NPL 2, a pin of 9⅝"×53.5 # and a coupling corresponding thereto are prepared to confirm the effectiveness of the experiment. The inventors performed a test by simulating it, i.e. by preparing a pin made of carbon steel and so on, applying Mn phosphate chemical conversion coating as a surface treatment of a coupling, applying shot blast to the surface of the pin, and using a device simulating the technology of NPL 2. In this event, after applying a general compound to threaded joints on both sides of the pin, tightening by hand was performed to a position where it stopped, as an initial set position before make-up (a set position before make-up by power tongs). That is, a make-up/break-out test was performed from the state where the make-up was performed to the state with one to three crests remaining from an end face of the coupling. As a result of the test, three times of Make & Break was able to be performed, which was regarded as a pass determination. Next, evaluation was performed by shifting it to a conventional lab test using a pin with an actual length, and as a result, the seizure occurred on the threads. From this, even if the condition that can obtain a pass is found out in the evaluation test based on the conventional technology, there is a possibility that the seizure occurs by using the pin with the actual length. Therefore, according to the studies of the inventors, it has been found that a method of evaluating the seizure resistance when using the pin with the actual length is not clarified with this conventional technology.

Herein, a make-up/break-out test other than in a usual rig is performed indoors with limited ceiling height. Therefore, conventionally, in a test using vertical tongs, use is made of a pin that is much shorter than a pin employed in an actual well. When a test is performed using a pin with a length that is used in an actual well, horizontal type tongs are often used.

In these evaluation methods, make-up is performed after temporary fixing is performed to a status where threads are exactly engaged with each other by tightening the short pin by several turns or more in a manually turnable range by hand before the make-up by the power tongs. That is, conventionally, the make-up by the power tongs is performed after the completion of the substantial axis alignment. On the other hand, in an actual well site, use is made of a pipe of, for example, 12 m, which is longer than the short pin in the lab. In addition, tightening by hand is performed only by several turns, and in the most severe case, tightening by hand is often omitted. Therefore, in the actual well site, it has been imagined that the misaligned engagement and the misalignment at the beginning of the make-up become significant, resulting in severe make-up condition. However, the causal relationship of make-up behavior is complicated, and conventionally, in order to make an evaluation by the lab, it is the actual situation that there is no other method but to merely set a pass determination line of the number of times of make-up/break-out to be more. Actually, a method of a severe test in a lab test is usually not in operation.

CITATION LIST

Patent Literature

PTL 1: JP 2002-327874 A

Non Patent Literature

NPL 1: API RP 5C5 Latest Edition (4th Edition, January 2017): Procedures for Testing Casing and Tubing Connections NPL 2: Tsuru et al.: Journal of the Japanese Association for Petroleum Technology, Vol. 61, No. 6, (1996), pp. 527-536

SUMMARY OF INVENTION

Technical Problem

The present disclosure has been made in view of the points described above and has an object to provide a make-up/break-out evaluation method for a threaded joint for oil country tubular goods that makes it possible to evaluate the seizure resistance of the threaded joint for oil country tubular goods accurately without performing a test using a threaded joint with an actual length.

Solution to Problem

In order to solve the problems, the gist of the present disclosure is a make-up/break-out evaluation method configured to perform make-up/break-out by power tongs with respect to a threaded joint for oil country tubular goods including a box having a female thread and a pin having a male thread, wherein the make-up/break-out evaluation method includes: when performing a make-up/break-out test with respect to the threaded joint for oil country tubular goods formed by attaching a lower portion of the pin to an upper portion of the box placed with an axis directed vertically, using, as the pin for use in the test, a pin for test formed by a pin shorter than an evaluation target pin; attaching a weight to an upper portion of the pin for test and setting a mass of the weight to be equal to or greater than a mass obtained by subtracting a mass of the pin for test from a mass of the evaluation target pin; and setting an initial set position to a state where five crests of the pin for test or ¼ of all crests of the pin for test, whichever is greater, or more are exposed from an upper end face of the box, the initial set position being a make-up start position before make-up, the make-up configured to make up the pin for test by the power tongs.

The evaluation target pin is, for example, a pin with a length that is actually used in an actual well.

Advantageous Effects of Invention

According to the present disclosure, even when a test is performed using a pin for test that is shorter than a pin with an actual length (an evaluation target pin), it is possible to evaluate the seizure resistance of a threaded joint for oil country tubular goods more accurately.

BRIEF DESCRIPTION OF DRAWINGS

FIGS. 11A and 11B are diagrams illustrating the behavior of a pin;

DESCRIPTION OF EMBODIMENTS

Figure 1:
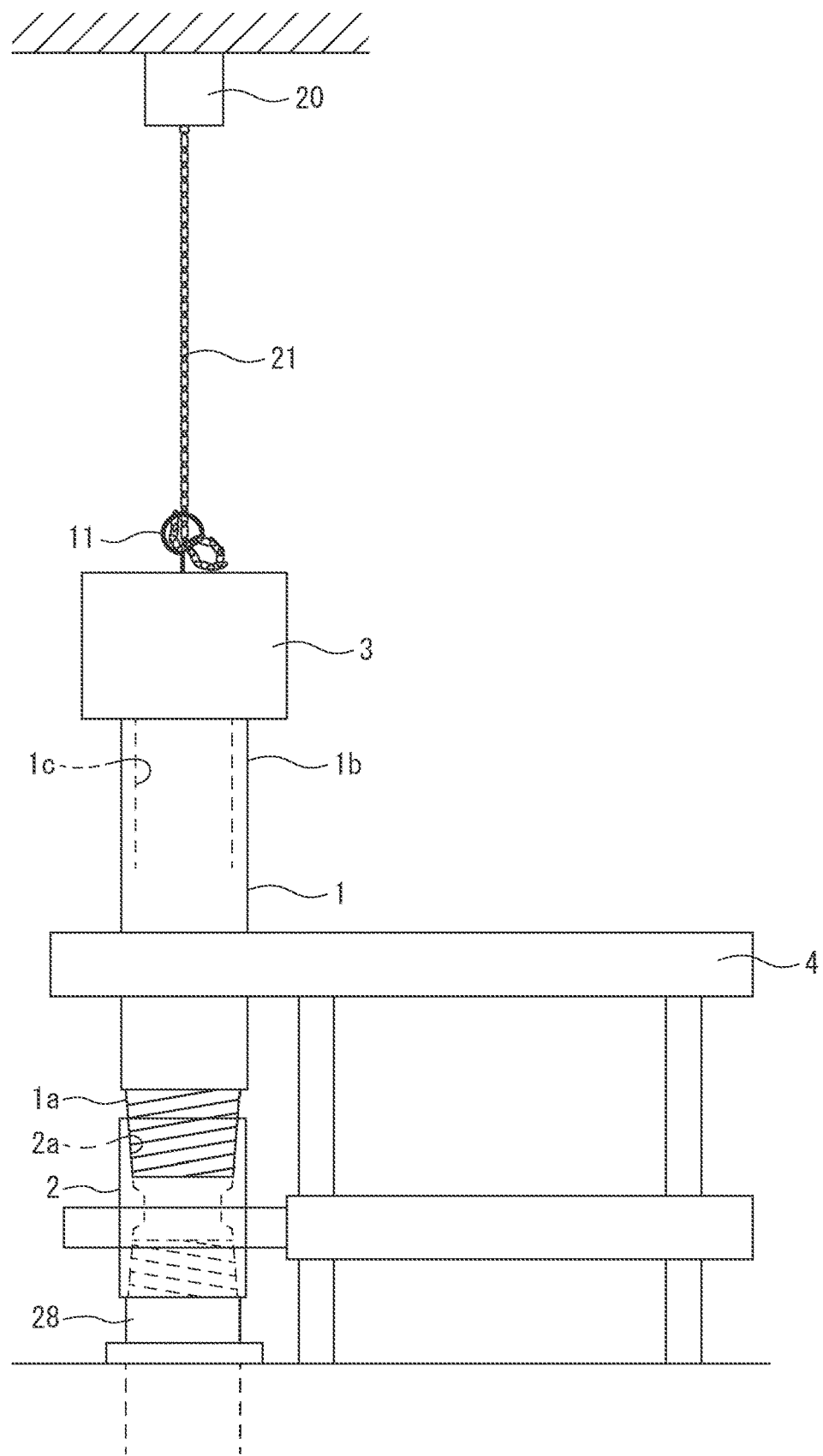
FIG. 1 is a schematic diagram illustrating the facility configuration for a make-up/break-out test according to an embodiment based on the present disclosure.

Next, an embodiment of the present invention will be described with reference to the drawings.

Herein, inasmuch as there is no reason for convenience, the same constituent elements will be described by assigning the same sign to them. In each of the drawings, there are cases where the thicknesses and the ratio of the constituent elements are exaggerated and where the number of the constituent elements is also illustrated differently from an implemented product. Further, the present disclosure is not limited to the following embodiment, and as long as it does not depart from the gist thereof, the present disclosure can be embodied with an appropriate combination or a modification, and a mode added with such a modification or improvement can also be included in the present disclosure.

Conventionally, there is the fact that, with respect to the new thread shape design of a threaded joint for oil country tubular goods and the surface treatment (plating, chemical conversion treatment) and the lubrication method (compound, solid lubricant) for a threaded joint for oil country tubular goods, the adequacy thereof cannot be confirmed without verification of the seizure resistance by a test using a pin with an actual length before putting on the market. However, according to the studies of the inventors, as described above, it has been found that even the method of evaluation by the severe test cannot achieve a proper evaluation with the conventional technology using the short pin.

Herein, the method described in NPL 2 is merely a method of simply placing a weight on an upper end portion of a pin. Therefore, in the method described in NPL 2, a severe make-up/break-out condition corresponding to an actual well as intended by the present disclosure cannot be simulated. The process of make-up/break-out in a make-up/break-out test is performed by power tongs from a make-up start position (initial set position) after tightening by hand.

The reason why the simulation cannot be performed as described above is as follows.

(a) First, with the applied load by the weight of the mass of 510 kg described in NPL 2, when a short pin is used, there is a possibility that the test does not become a severe test because of the loaded mass being too small. In particular, there is such a tendency when the diameter of the pin is large.

(b) Next, NPL 2 does not specify an initial set position (make-up start position) at the time of each make-up. However, in a conventional make-up/break-out test, make-up/break-out is repeated by power tongs after make-up to a degree that can be done maximally by tightening by hand. That is, conventionally, the initial set position before each make-up is a position tightened maximally by tightening by hand. However, in this case, it is not possible to simulate a phenomenon in which a pin swings around due to a backlash that occurs by loosely setting the pin, which is usually often observed in an actual well. In a recent actual well, a pin is often set on a box connection by remote control using a machine with no touch. Further, it is also often that make-up by power tongs is performed from the state where the pin is almost merely fitted in from above. Therefore, it has to be said that the method of NPL 2 is far from the make-up condition of the actual well.

On the other hand, in this embodiment, an initial set position before make-up, i.e. at the time of make-up by power tongs, is loosely set intentionally. Consequently, the make-up is performed while a pin is swinging around so that the make-up by the power tongs is performed under a condition close to an actual well condition.

Figure 15:
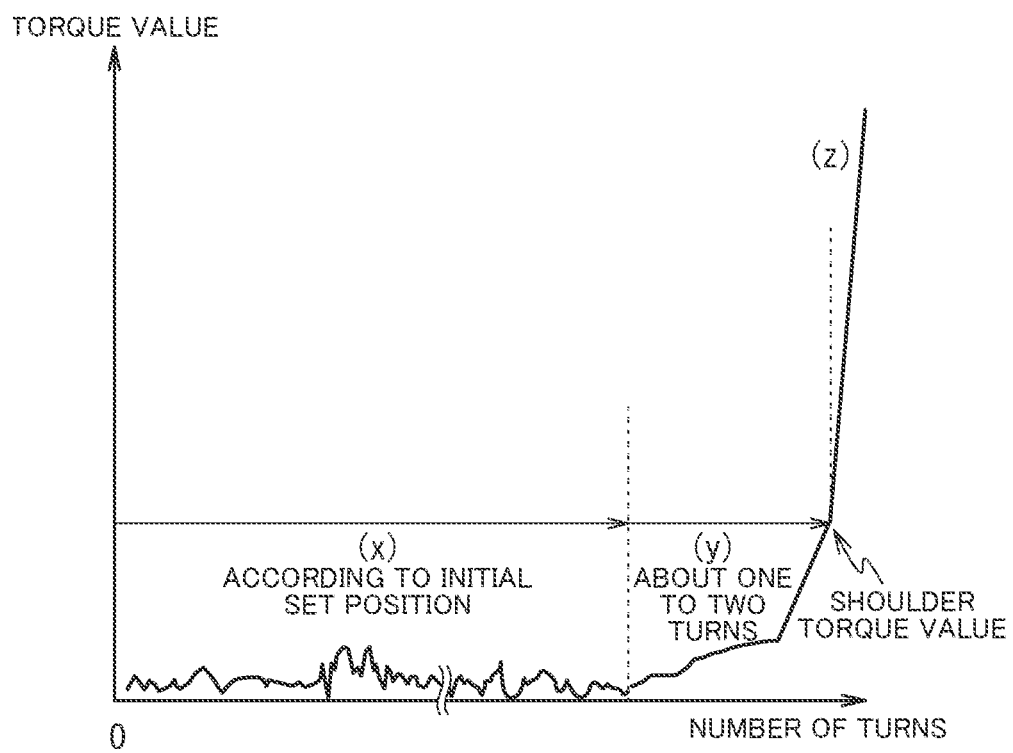
FIG. 15 is a diagram illustrating an example of the relationship between turns and torque at the time of make-up by power tongs in an evaluation method based on the present disclosure.
Figure 16:
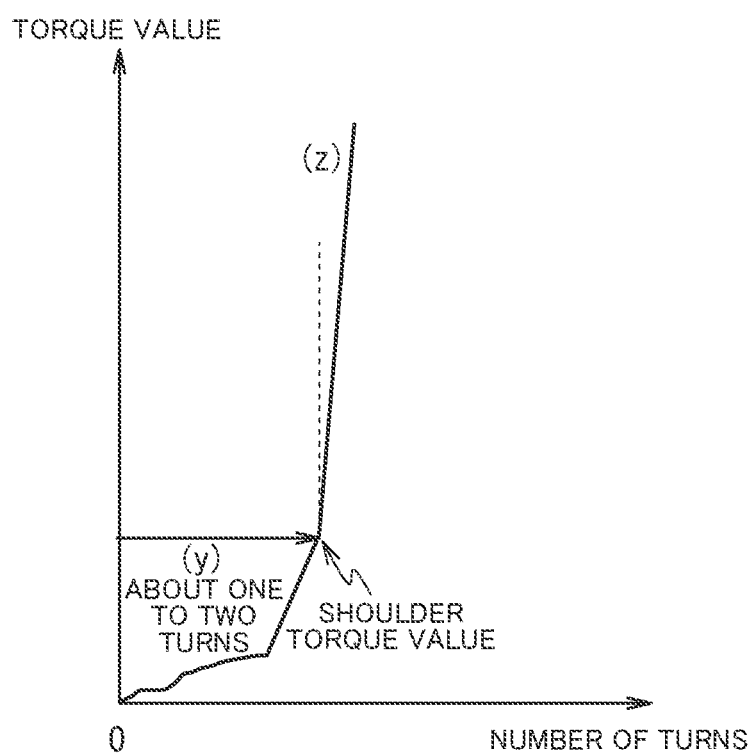
FIG. 16 is a diagram illustrating an example of the relationship between turns and torque at the time of make-up by power tongs, which is often observed in a conventional lab evaluation method.

Herein, the behavior of torque in make-up by vertical type power tongs will be described in detail using FIGS. 15 and 16. FIG. 15 is a torque/turn chart example in the case where make-up from the state where the initial setting is loose is performed based on the present disclosure. On the other hand, FIG. 16 is a torque/turn chart example in a conventional vertical type test.

In the case of the make-up by the power tongs based on the present disclosure, the pin is made up via regions (stages) (x), (y), and (z) in this order as illustrated in FIG. 15. On the other hand, in the conventional lab make-up test, the pin is made up via regions (stages) (y) and (z) in this order, not via a region (x). The inventors have confirmed that the relationship between turns and torque at the time of make-up by power tongs in an actual well becomes a graph that is approximate to the relationship between turns and torque illustrated in FIG. 15.

The region (x) illustrated in FIG. 15 is a phenomenon that is observed when a pin connection is loosely made up to a box connection. It is an ideal state in the region (x) that the pin connection is made up to the box connection so as to be engaged with the box connection with no interference therebetween. That is, in the region (x), the make-up should be in a state with no torque generated normally, but as a result of various experiments and so on by the present inventors, knowledge has been obtained that a number of spike-like torques are generated in the make-up in the region (x) as illustrated in FIG. 15. This is presumably because, in the region (x), the pin connection is misaligned with respect to the axis of the box connection so that the pin connection and the box connection locally abut on each other while make-up the pin connection to the box connection. Further, it is conceived that the actual well is affected by various conditions such as weather like wind and rain, offshore, desert, and cold district. This leads to a thought that the state where a number of spike-like torques are generated in the make-up in the region (x) as illustrated in FIG. 15 simulates the state in the actual well more properly.

Further, the present inventors have also obtained knowledge that, in a vertical type test using a short pin, when make-up is performed by applying a pin weight corresponding to an actual length to the short pin, the generation of spike-like torques increases in the make-up in the region (x).

After the region (x), the threads go through the region (y), i.e. a lubrication state until the threads come in complete contact with seal portions (see FIG. 15). Although it depends on the design of the connection for oil country tubular goods, the region (y) corresponds to about one to two turns. Then, after coming in complete contact with shoulders, the pin connection turns in the region (z), i.e. from the state in contact with the shoulders, so that the torque rapidly increases to make up the connection finally.

As described above, the make-up in the region (x) illustrated in FIG. 15 can occur in the actual well. From the knowledge described above, the region (x) causes deformation or breakage of the crest, breakage of a Mn phosphate layer or a metal plating layer as a base, or impediment to uniform development of an applied compound to induce development unevenness of the compound. Further, in the case of a solid lubricant film, the region (x) causes breakage or peeling of the film. Therefore, it is seen that concern increases that the pin connection is damaged not a little along with damage to the box connection. Based on the knowledge described above, the present disclosure presents a simulatable test by applying the load to the short pin and loosely setting the initial make-up start position.

On the other hand, as illustrated in FIG. 16, in a state tightened to the limit by tightening by hand, there is no make-up in the region (x), and make-up is performed only in the regions (y) and (z). Therefore, this merely simulates the lubrication until reaching a state in complete contact with the shoulders, and therefore, it is hard to say that what is occurring actually is fully simulated. When the load is applied to the pin in this state, the make-up is performed with the axis of the pin being straight with respect to the box connection. Therefore, the lubrication becomes rather stable with the load applied to the pin. As a result, the test is evaluated to be excessively good such that the lubrication characteristics are stable and that the number of M/B times is large.

Through the studies described above, the inventors have obtained knowledge that it is possible to reproduce a severe make-up condition thought to be unique to an actual well, by devising a very early state of thread make-up in which torque is not usually measured, or devising make-up/break-out weight conditions, without using a long pin (an evaluation target pin) for use in the actual well. Further, knowledge has also been obtained that, by adjusting the load by a weight applied to a pin, it is possible to show that the disturbance of torque in very early make-up relates to the later disturbance of torque or flaws of thread surfaces.

Herein, the torque turn chart is a determination method that makes it possible to understand characteristic evaluation at the time of make-up/break-out most simply. Even when this chart is normal at first glance, there are cases where flaws occur on the threads due to repeated make-up and so on. On the other hand, when this value starts to increase at a stage where make-up is looser than usual, it is possible to determine that make-up is not performed normally.

(c) The third problem of NPL 2 is the load condition of a weight at the time of break-out.

Further, the present inventors have obtained knowledge through various experiments that when loosening threads after make-up is performed by loosely setting an initial set position intentionally to allow a pin to easily swing around at the time of the make-up, it is possible to simulate a status that is more severe than a status close to an actual well when a weight is not placed or the load applied from the pin and the weight to the female thread is lower.

That is, in the method described in NPL 2, when loosening (break-out) threads, the load by a weight is dispersed symmetrically and uniformly and applied to the axis center of the thread of a short pin. Therefore, the engagement state of the threads is rather stabilized. Then, the threads are loosened straight from a made up position without causing a backlash. As a result, in the method described in NPL 2, it is hard for the pin to swing around so that it is not possible to properly simulate the occurrence of the seizure at the time of break-out that is likely to occur in an actual well. Depending on the status, a status may occur that misleads that the lubrication characteristics are good. Taking this into account, the inventors have obtained knowledge that, at the time of break-out in which a pin often swings around in an actual well, it is preferable as a more accurate simulation of an actual well condition that the load that is applied to the pin be reduced intentionally so that, where possible, the load by a weight is almost not applied so as to provide a state where the pin easily swings around.

Therefore, in this embodiment, taking this into account, the load is applied by a weight to a pin for test at the time of make-up. Further, the applied load by the weight is reduced at the time of break-out. The weight applied at the time of the make-up takes into account that the pin weight is applied to a box connection (female thread) in an actual well. On the other hand, the reduction of the applied load by the weight at the time of the break-out is for simulating a backlash of a pin connection that is likely to occur in break-out in an actual well.

Naturally, the present disclosure includes a case where the reduction of the applied load by the weight is not performed at the time of the break-out. Even in that case, this embodiment makes it possible to perform an evaluation more accurately than conventional. Certainly, even if the load is not removed at the time of the break-out, it is possible to reproduce the load to a thread surface of the body of a long pipe in an actual well by the use of the weight at the time of the make-up. Therefore, the present disclosure enables an evaluation closer to an actual well compared to a general conventional make-up method.

Herein, in a test with a short pin in a horizontal type test, there is no influence of the self-weight of the pin on a threaded joint. Even in a test with a short pin in a vertical type test, when a weight is not used, only a weight corresponding to about 1/10 of a length of an actually used pin (an evaluation target pin) is applied to a female thread of a box. Assuming that the actual pin is about 8 to 12 m, the short pin is often about 1 m.

On the other hand, under the most severe condition in an actual well, Make & Break is performed using a pin formed by connecting three pins, for example. Therefore, it is preferable to perform a test by taking into account the load in the three-pin connected state to estimate the weight of the actual pin (see FIG. 11B; an example of two-pin connection). That is, it is preferable to be able to simulate that the load from a load applied in an actual well to a more severe load is applied to stabbing flanks. The stabbing flanks are surfaces that come in contact with each other when the threads are on the make-up side, and that correspond to vertical walls of the female thread and the male thread. These surfaces are neither a crest surface nor a bottom surface, but are inclined surfaces of the threads that come in contact with each other while being on the make-up side.

It is important to consider not only the mere applied load as described above, but also the effect of a backlash. That is, the seizure resistance can be properly evaluated by also simulating a backlash in the initial setting (see FIGS. 2 and 3) that is likely to occur in an actual well.

Figure 2A:
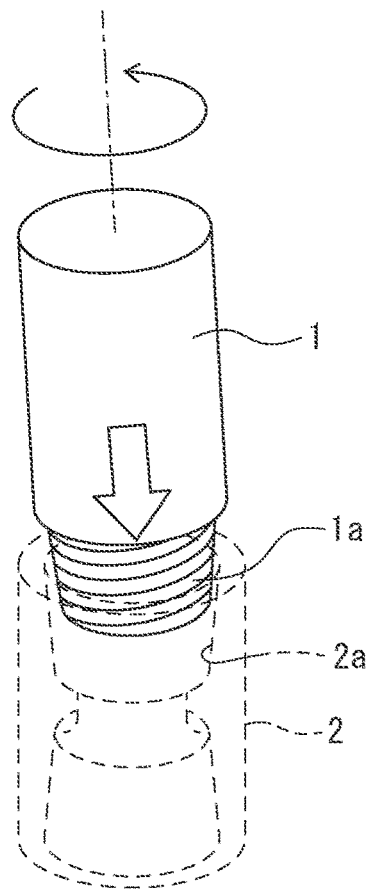
FIGS. 2A and 2B are diagrams for explaining a backlash according to an initial set position.
Figure 2B:
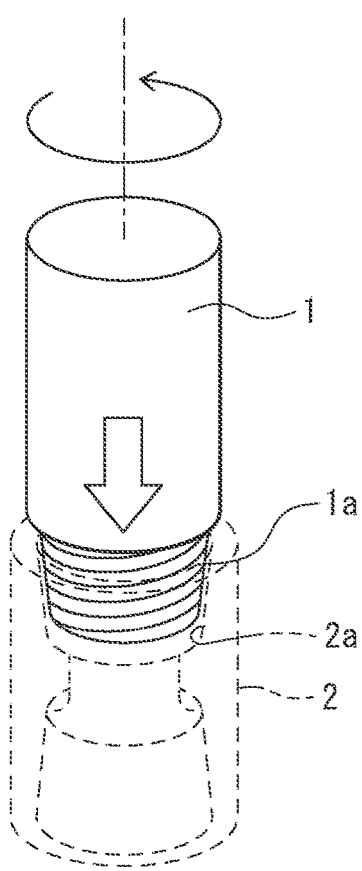
Figure 3A:
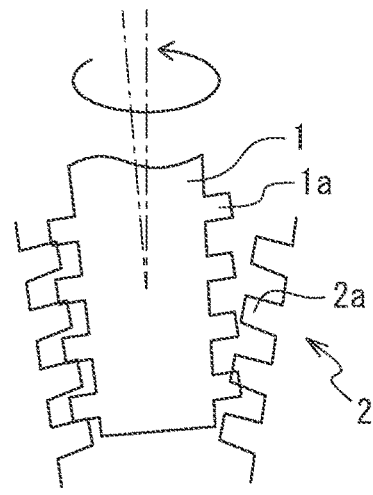
FIG. 3A to 3C are diagrams for explaining a backlash between a male thread and a female thread.
Figure 3B:
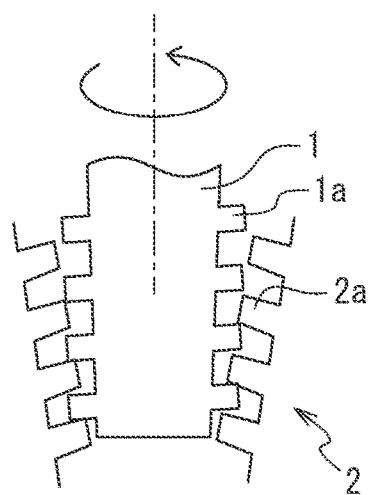
Figure 3C:
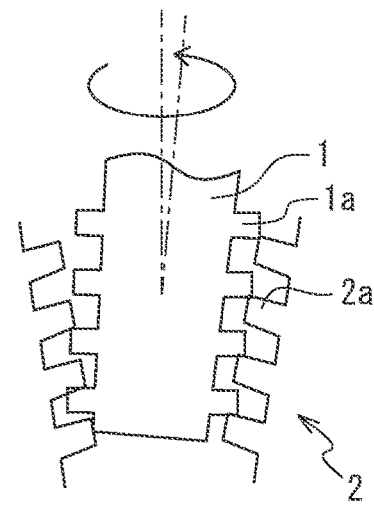

Herein, as illustrated in FIG. 2A, when a pin 1 is merely placed (stuck) in an upper portion of a box 2, this results in a state where about half of crests of a male thread 1a of the pin 1 are exposed from the box. Therefore, the pin tends to backlash when made up by power tongs. On the other hand, as illustrated in FIG. 2B, as the make-up proceeds, the backlash of the pin 1 in the make-up decreases. As illustrated in FIG. 3, there is always a backlash structurally in the joint due to the taper of the crest of the pin.

Taking the above into account, in this embodiment, even when a pin shorter than an evaluation target pin is used as the pin 1 for test, i.e. the pin for use in the test, the initial set position before make-up that is performed by vertical type (the type that makes up a pin and a box in the vertical direction) power tongs 4 is determined on a looser side than conventional. Further, in this embodiment, the load is applied to the pin 1 by a weight 3. Consequently, this embodiment realizes a more proper seizure resistance evaluation method that takes into account the problem of the applied load by the weight 3 and the problem of "backlash in the initial setting" described above.

FIG. 1 illustrates a schematic diagram of the device configuration for a make-up/break-out test in this embodiment.

In this embodiment, the make-up/break-out test is performed with respect to a threaded joint for oil country tubular goods formed by attaching a lower portion of a pin from its upper side to an upper portion of a box 2 placed with its axis directed vertically. In the test, as the pin for use in the test, use is made of a pin 1 for test formed by a pin shorter than an evaluation target pin that should be evaluated in the test. A male thread of the pin 1 for test has the same structure as a male thread of the evaluation target pin.

Further, a weight 3 is attached to an upper portion of the pin 1 for test. The mass of the weight 3 is set to be equal to or greater than the mass obtained by subtracting the mass of the pin 1 for test from the mass of the evaluation target pin, or simply set to be equal to or greater than the mass of the evaluation target pin.

The initial set position is set to a state where five crests of the pin 1 for test or 1/4 of all crests of the pin 1 for test, whichever is greater, or more are exposed from an upper end face of the box 2.

The initial set position is a make-up start position before make-up, i.e. make-up the pin 1 for test by power tongs 4.

In this embodiment, it is possible to lift the weight 3 using a crane or other lifting device 20 (heavy equipment). Sign 21 denotes a chain serving as a sling for the crane. By making it possible to lift the weight 3, it is possible to adjust the application of the load by the weight 3 to a female thread 2a of the box 2 via the pin 1.

In this event, the weight 3 may be connected to the pin 1. In this case, by lifting the weight 3, it is also possible to adjust the application of the load to the female thread 2a of the box 2 by the mass of the pin 1.

The example of FIG. 1 shows by way of example the type in which the box 2 is used for fixing a lower portion of the power tongs 4. In that case, a pin 28 that is tightened by hand is fixed to a lower portion of the box 2 so that the displacement of the box 2 is prevented when the power tongs 4 grip the box 2. On the other hand, according to the type of power tongs, there are cases where the pin 28 that is fully made up is used as a fixing position of the lower portion of the power tongs 4. In the present disclosure, there is no limitation to a fixing method for the lower portion of the power tongs 4.

In this embodiment, when make-up by the power tongs 4, the chain 21 is set to a loose state (non-lifting state) so that the mass of the weight 3 and the pin 1 is applied to the female thread 2a. On the other hand, when break-out by the power tongs 4, the weight 3 is lifted by the chain 21 so that the applied load to the female thread 2a by the weight 3 is reduced. In this event, when the weight 3 and the pin 1 are connected together, the applied load to the female thread 2a by the pin 1 can also be reduced. The reduction of the applied load controls a lifting state by the crane 20 in such a way that the mass of the weight 3 and the pin 1 is not applied to the female thread 2a, for example. The reduction of the applied load is not limited to the case where the applied load by the weight 3 and the pin 1 is controlled to be zero. For example, the mass corresponding to the weight may be reduced as described above, or the lifting may be controlled so that the applied load becomes equal to or less than half of the total load of the weight 3 and the pin 1.

Only the lifting by the crane 20 for load reduction makes it possible that the posture of the pin 1 at the time of break-out is made unstable. Therefore, the load reduction amount may be set to be small.

Herein, the present disclosure includes a test that is performed without lifting the weight 3 at the time of break-out.

(About Initial Set Position)

Herein, in general, in a make-up/break-out test using a short pin, since it is possible to perform make-up with less misalignment of the axes of the male thread 1a and the female thread 2a, tightening by hand can be performed to a position where about one to three or less crests of the pin 1 are exposed. When the make-up/break-out test is performed from this position using the power tongs 4, even when the pin 1 has a large diameter size such as 9⅝" or 13⅜", the seizure is hard to occur. However, as in this embodiment, in the case where tightening by hand is stopped before full engagement of the male thread 1a and the female thread 2a to set a state with a backlash to be an initial state before make-up, when make-up is performed by the power tongs 4, swinging around of an actual-length pin can be reproduced by the short pin 1 to provide a condition where the seizure tends to occur. That is, a severe test can be achieved where the make-up state in an actual well is simulated.

Figure 13A:
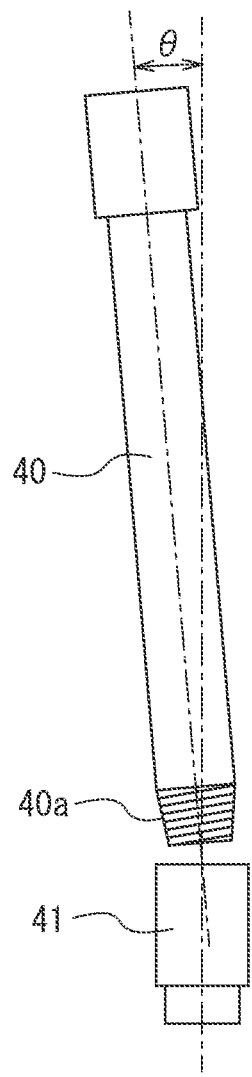
FIGS. 13A and 13B are diagrams illustrating an example of bending of a pin due to axial misalignment.
Figure 13B:
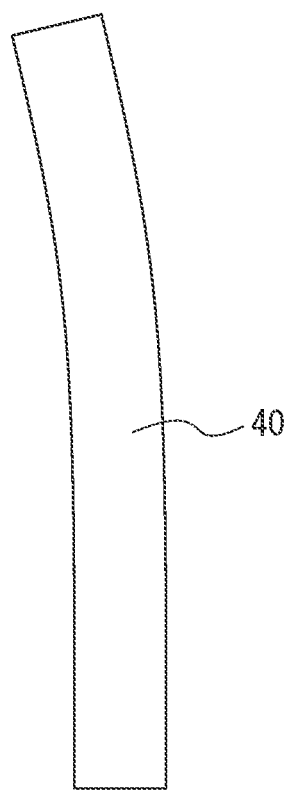
Figure 14A:
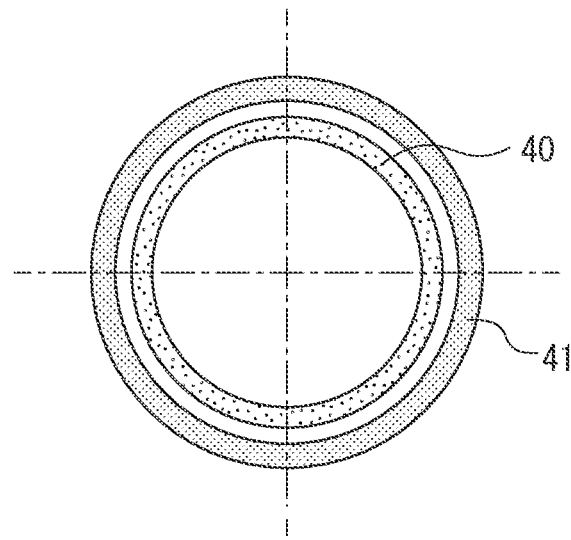
FIGS. 14A and 14B are diagrams illustrating the relationship between the center axes of a pin and a box in the initial setting of a threaded joint.
Figure 14B:
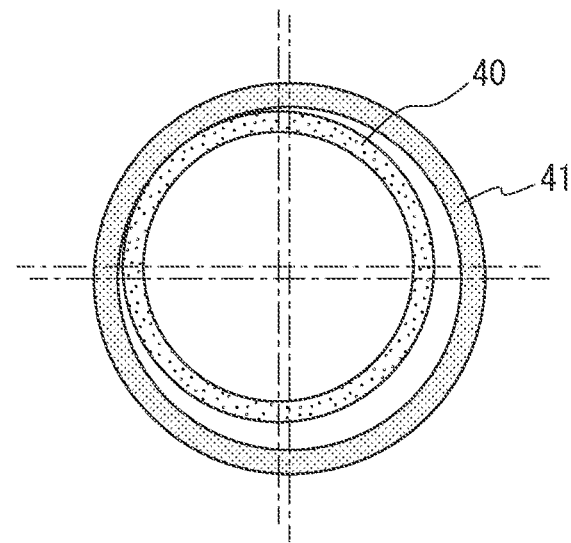

With respect to the engagement of a box and a pin and the initial setting condition thereof, there is no case where the pin is set to be completely straight in an actual well. There is a tendency that the pin is set to be slightly oblique (see FIG. 13). Therefore, in the actual well, it is not possible to provide a setting to a degree where about one to three crests of the pin connection are exposed from the box 2, which is often observed in a lab (test site). In most cases, the initial set position in the actual well becomes a position where the pin connection is exposed exceeding the state where about one to three crests are exposed.

The relationship between turns (the number of turns) and torque at the time of make-up by power tongs is, for example, as illustrated in FIG. 15 described above, and the torque rapidly increases with a turn near the completion of the make-up. Therefore, in the actual well, the status often occurs where about seven to nine threads are exposed even by tightening to a position that can be achieved by hand. Rather, the status where about one to three threads can be made up after tightening by hand is rare.

Observing the entire pin, the pin is not made up straight in the actual well. The state is such that the pin is set on the box by tightening by hand and suspended by a wire from the side opposite to the side to be tightened. From that state, the pin is turned by the power tongs so as to be made up or broke out. In that event, as the pin gets away from the position of the box made up, an end portion of the pin is tightened or loosened while bending and swinging. The point is, the status is such that make-up/break-out is performed while being not made up uniformly so that there are portions, in the thread portions, that contact with each other locally strongly or weakly, i.e. there is a "backlash". Such a status is not easily seen when observing from a distance in a status where an actual-length pin is used, but is clearly seen when looking up at a portion above the power tongs to observe the turning of the pin at the time of make-up. It can actually be seen that, as illustrated in FIG. 11B, with a box 30c as a bending point, pins 30a, 30b on both sides are made up while keeping balance and turning.

In this embodiment, a proper simulation test of such a status is performed in a lab (test site) without performing a test with an actual-length pin and using a short pin shorter than the actual-length pin, which is intended in the present disclosure. Therefore, by devising to provide a state where the combination of the load to be applied, the load application method, the length of the short pin, and the setting way (initial set position) at the time of make-up is more optimized, it is possible to realize to obtain a more accurate evaluation.

In this embodiment, for example, when performing a make-up/break-out test, the weight 3 is slung from above by the heavy equipment (the lifting device 20) such as the crane. Then, the magnitude of the applied load by the weight 3 to be applied to the box 2 side (the female thread 2a side) via the upper portion of the pin 1 for test is adjusted according to the suspension condition of the weight 3 by the heavy equipment 20. For example, at the time of make-up, the hanging chain 21 is loosened to apply the mass of the weight 3 to the box 2 side (the female thread side) via the pin 1. On the other hand, when the load by the weight 3 is not applied or is reduced, it is possible to deal with this by applying tension to the hanging chain 21. Consequently, the load applied to the pin 1 by the weight 3 can be adjusted. As a result of performing various studies, the present inventors have obtained knowledge that, at the time of make-up, the application of the load to the female thread 2a side of the box 2 results in a severe condition, and that, at the time of break-out, a severe condition is provided in such a way that the weight 3 is in a state of being suspended so as not to apply the mass of the male thread 1a (the pin 1) including the weight 3 to the female thread 2a side so that the swinging around of the pin due to a backlash occurs. In this embodiment, such a state can be simulated.

(Pin 1 for Test)

In this embodiment, the combination of the length of the short pin 1 and the application of the load to the female thread using the weight 3 is also important. For example, when the length of the short pin 1 is 3000 mm to 5000 mm, by applying a load equal to or greater than a weight corresponding to a pin raw pipe of 8 m at the time of make-up and by applying the load also at the time of break-out, it is possible to simulate a make-up/break-out status using an actual-length pin in an actual well. However, with the short pin with such a length, handling in an experiment often becomes slightly difficult.

On the other hand, when a short pin with a length of 600 mm or more to 2,000 mm is used, by applying a load equal to or greater than a weight corresponding to a pin raw pipe of 8 m at the time of make-up likewise and by applying no load at the time of break-out conversely, it is possible to more easily simulate a make-up/break-out status using an actual-length pin in an actual well.

As described above, in this embodiment, it is intended that the adequacy of the lubrication and the seizure of the thread portion for oil country tubular goods that can occur in the running using the actual-length pin in the actual oil/gas field is simulated more accurately than conventional in an experimental site.

The actual laying of a pin is performed by make-up, using the power tongs 4, pins of 8 to 12 m class (25 to 40 ft class) one by one, or a pin formed by connecting two or three pins. In this event, in the actual laying, a pin 30 is made up while being suspended by a wire from above by a crane 32 (see FIGS. 9 and 10). However, structurally, it is impossible that the load applied to a female thread becomes completely zero. Since it is necessary that the position of the pin shift downward as a male thread of the pin is made up, the status is such that, in the most severe case, all the pin load is applied to the box side on the lower side. In the actual laying, when the make-up is loosened, the pin is loosened while being suspended by the wire from above, and therefore, the status is such that the load of the pin 30 is slightly not applied to the box 31 side. However, in the most severe case, the status is such that all the self-weight of the pin 30 is applied to the box 31 side.

Hereinafter, this embodiment will be described more specifically.
(Evaluation Method)

This embodiment is a make-up/break-out evaluation method for a threaded joint for oil country tubular goods composed of the box 2 having the female thread 2*a* and the pin having the male thread 1*a*, and is a vertical type make-up/break-out evaluation method in which the axis of the joint is set in the vertical direction. That is, a make-up/break-out test is performed using the power tongs 4 with respect to the threaded joint for oil country tubular goods formed by attaching a lower portion (thread portion) of the pin from its upper side to an upper portion (thread portion) of the box 2 fixed with its axis directed vertically. This is based on the fact that, in the running in an actual well, the female thread 2*a* is set below and the male thread 1*a* side is set above. In the case of a T & C type threaded joint, the lower side corresponds to the coupling (the box 2) and the upper side corresponds to the pin. In the case of an integral type threaded joint, the lower side is the box 2 and the upper side is the pin.
(Pin 1 for Test)

In this embodiment, a short pin shorter than an evaluation target pin and having the same connection structure as the evaluation target pin is used as the pin 1 for test. The pin 1 for test is produced by cutting the evaluation target pin, for example.

The length of the pin 1 for test is in a range from 600 mm or more to 5000 mm or less and preferably in a range from 600 mm or more to 2000 mm or less, for example.

The setting to 600 mm or more is determined from approximately the minimum length that can ensure a grip portion of the power tongs 4. The setting to 5000 mm or less, preferably 2000 mm or less is determined from the limit of the length that can be easily handled. The setting to 5000 mm as the upper limit is determined such that since there are many actual-length pins of 8 to 12 m classes (25 to 40 ft classes), 5000 mm is approximately half thereof. The longer, the more it approaches the actual-length pin. In this case, even when the weight 3 is not particularly applied, make-up becomes make-up with the actual-length pin itself, and therefore, there is also an implication of the limit length for handling in a lab experiment.

Practically, for example, a pin of around 1 m (e.g. 600 mm to 1500 mm) is easy to use as the pin 1 for test. This length of the pin 1 for test is a length selected for ease of handling, but is an appropriate length also in terms of ease of fixing the weight 3 described below. A pin having a configuration in which a plurality of pup joints are connected together may alternatively be used as the pin 1 for test.

Although the length on the box 2 side is not particularly specified, a box for use in an actual well itself may be used. It is preferable to perform a test by fixing the pin 1 loosely by tightening by hand so that, when gripping by tongs, a thread surface on the side opposite to the evaluation target side is prevented from being crushed.

On the other hand, when the applied load by the weight 3 is not reduced at the time of break-out, the length of the pin 1 for test is preferably set to a length of 3000 mm or more and 5000 mm or less, for example. This is because the optimal range of the length of the pin 1 for test differs depending on a combination by a load application method, which will be described later. When the applied load by the weight 3 is not reduced at the time of break-out, i.e. when make-up/break-out is performed with the applied load as it is, it is preferable that the length be equal to or greater than 3000 mm. This is because, in the case of less than 3000 mm, unless the load is reduced by lifting the weight 3 at the time of break-out, there is a possibility that it is not possible to simulate a condition in an actual well more accurately.
(Applied Load by Weight 3)

In this embodiment, a make-up/break-out test is performed by attaching the weight 3 to the upper portion of the pin 1 for test to apply the load.

The mass of the weight 3 is set to be equal to or greater than (mass of an evaluation target pin (actual pin)—mass of the pin 1 for test), for example. Alternatively, the mass of the weight 3 is set to a mass of an evaluation target pin with a length equal to or greater than 8 m, for example. The upper limit value of the mass of the weight 3 is set to three times the mass of the evaluation target pin (actual pin), for example. At the present stage, the application of greater mass does not reflect a make-up condition in an actual well. However, when new way of thinking is devised from the way of connecting three pins at maximum so that four or more pins are connected together, that method is included in this application.

As described above, the mass of the weight 3 is defined as a lower limit when, for example, the load applied to the female thread 2*a* corresponds to a mass corresponding to a mass of an evaluation target pin itself, and for example, a mass corresponding to a case where three evaluation target pins are connected together is defined as an upper limit. The reason for attaching the weight 3 of the mass corresponding to the mass of the actual-length pin or corresponding to the three-pin connection is as follows. That is, at the time of actual Make & Break in an actual well, the running operation is performed by make-up one by one in a land well (land rig) so that the self-weight of a single pin is applied at maximum. The reason for three pins is that, in a sea well (sea rig), three pins connected together in advance are carried to the rig, and make-up is often performed per three pins in the rig, which is taken into account.

Figure 9:
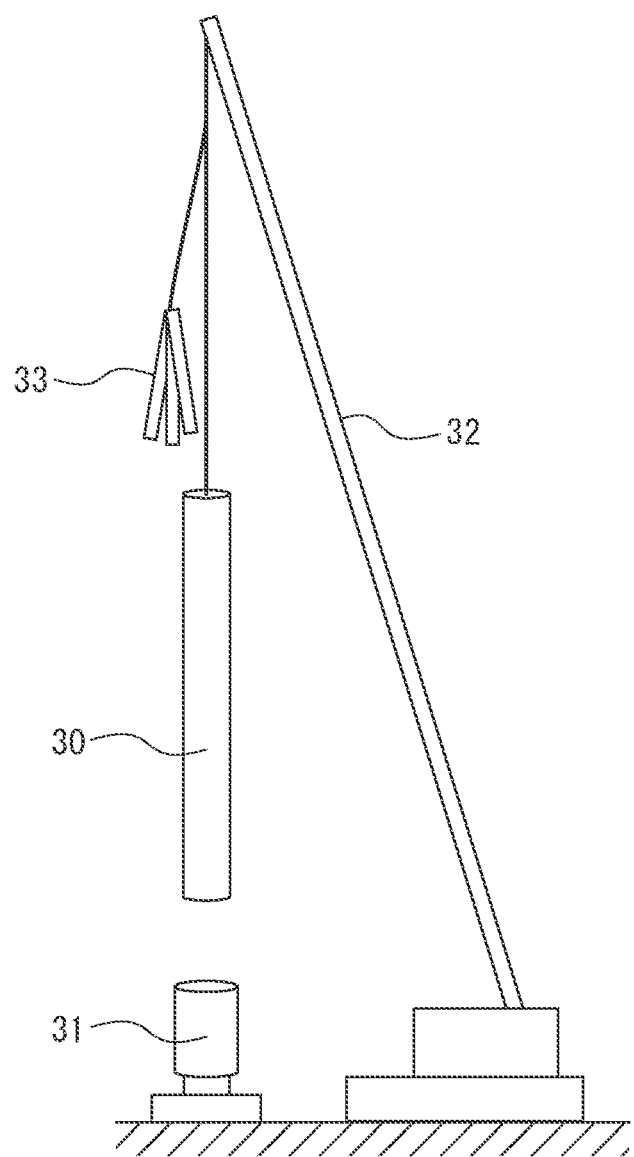
FIG. 9 is a schematic diagram of make-up of connection in an actual well.
Figure 10:
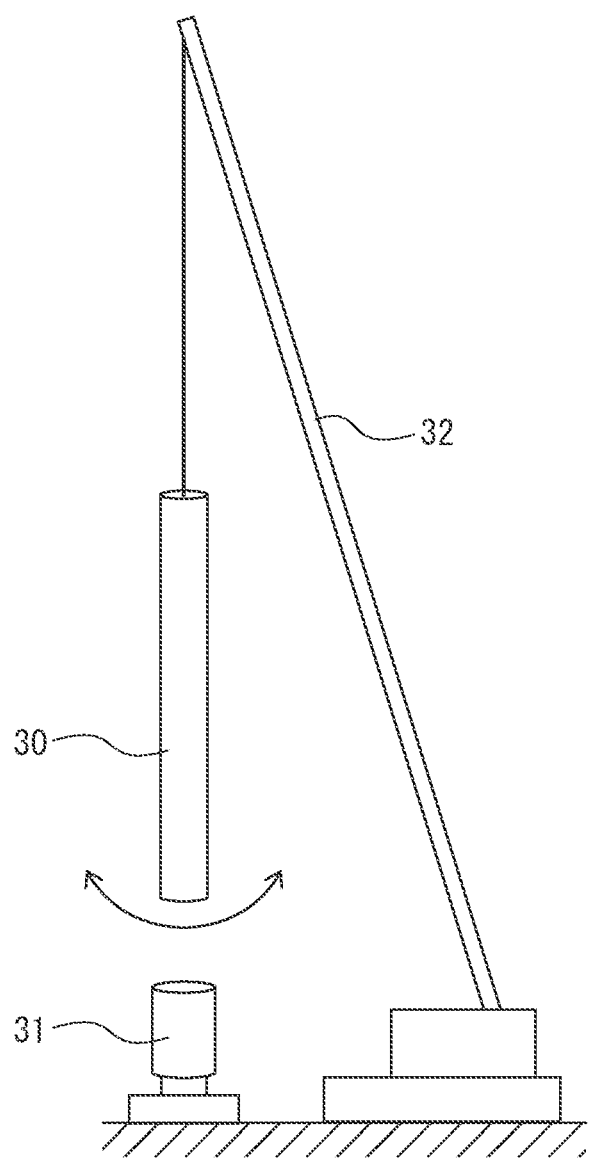
FIG. 10 is a schematic diagram of make-up of connection in an actual well.

However, in Make & Break in the actual well, as illustrated in FIGS. 9 and 10, since make-up is performed while suspending a pin by a derrick crane, it is not that all the self-weight of the pin 30 is applied to the box 31 side. Specifically, in the actual well, the pin is lowered while make-up the connection, and therefore, in principle, it is not possible to make zero the load of the self-weight by completely lifting the pin. Therefore, the mass of the weight 3 for use in a test is preferably a mass that can simulate an applied load that can be applied maximally. However, taking into account a test of a severe condition, it is technically possible to increase the mass of the weight 3 to a desired level. Technically, the mass of the weight 3 is only determined by a crane (heavy equipment) that suspends the pin 1 for test along with the weight 3 and sets it on the box 2. It may be configured to lift the weight 3 by another crane.

(Setting Method of Weight 3 and Shape of Weight 3)

The weight 3 is attached to the upper portion of the pin 1 for test on the side opposite to the make-up side of the pin 1. This is for simulating a status close to an actual status of use of connection by applying the load at the time of make-up. The upper portion of the pin 1 is, for example, a position of a thread portion formed on the upper portion side, or a range around it.

There is no particular limitation to a method of attaching the weight 3 to the upper portion of the pin 1 for test.

Next, examples of attaching the weight 3 (Attaching Examples 1 to 3) will be described.

Attaching Example 1

Figure 4:
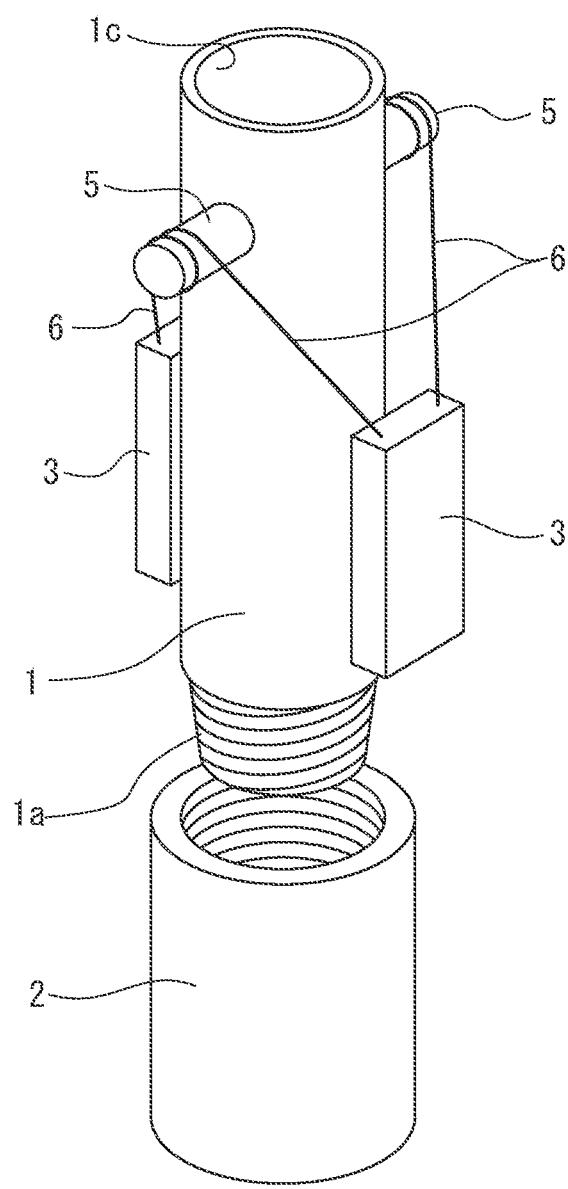
FIG. 4 is a diagram for explaining an example of attaching weights to an upper portion of a pin.

In Attaching Example 1, as illustrated in FIG. 4, jigs 5 are fixed for attaching the weights 3 to a side surface of the upper portion of the pin 1 for test. In FIG. 4, hooking rods are illustrated as the jigs 5 by way of example. Then, by suspending the weights 3 with respect to the jigs 5 by slings 6 such as ropes or chains, the weights 3 are attached to the upper portion of the pin 1.

In FIG. 4, a plate-like block body is illustrated as the shape of the weight 3 by way of example, but the shape of the weight 3 may be another shape. It is preferable that jigs 5 that can be lifted by the crane 20 be provided to the weights 3.

In this case, when the pin 1 swings, the weights 3 also move so as to swing around.

In this case, the actual height position of the weights 3 is not located in the upper portion of the pin 1. However, the position of load application to the pin 1 by the weights 3 (the support position of the weights 3) is located in the upper portion of the pin 1.

Attaching Example 2

Figure 5:
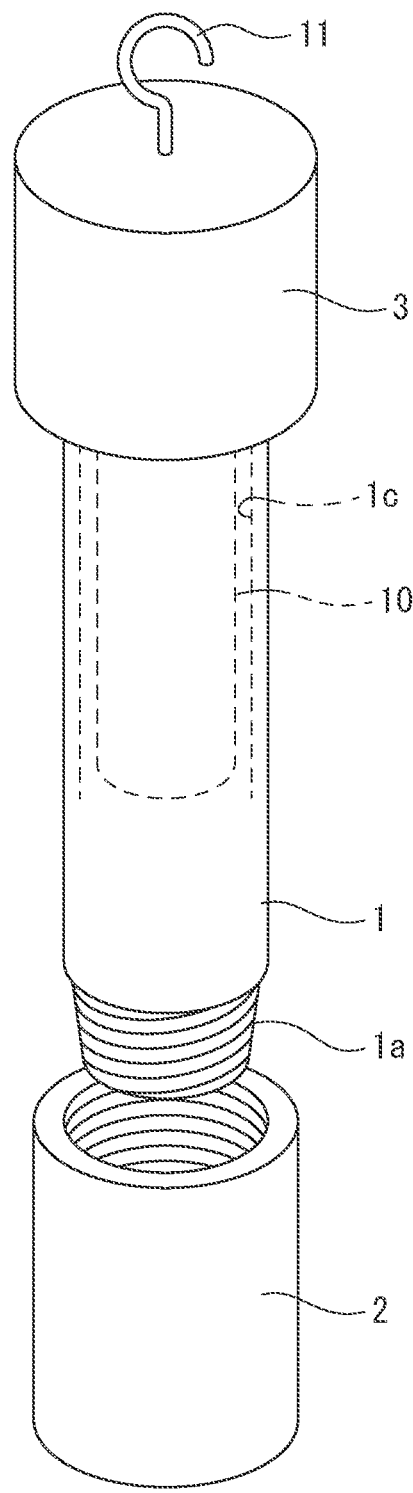
FIG. 5 is a diagram for explaining an example of attaching a weight to an upper portion of a pin.

In Attaching Example 2, as illustrated in FIG. 5, the weight 3 has a billet-like cylindrical shape with a lower surface having a diameter greater than that of the pin 1 for test. An upper end portion of an insert rod 10 is integrally fixed to the lower surface of the weight 3 by welding or the like in advance. The diameter of the insert rod 10 is set to a diameter smaller than the diameter of an inner diameter surface 1c of the pin 1 for test. It is preferable that a metal fitting 11 that can be lifted by the crane 20 be provided to an upper portion of the weight 3.

Then, in Attaching Example 2, in a state where the insert rod 10 is inserted from the upper side into an upper end opening of the pin 1 for test, the weight 3 is placed on the upper end of the pin 1 for test.

In this case, in response to swinging of the pin 1 in the lateral direction, the center of gravity of the weight 3 gets eccentric so as to be displaced in the lateral direction. Further, by the insert rod 10, the weight 3 is hard to fall off the upper portion of the pin 1. The length of the insert rod 10 is preferably half or more of the length of the pin 1 for test.

Attaching Example 3

Figure 6:
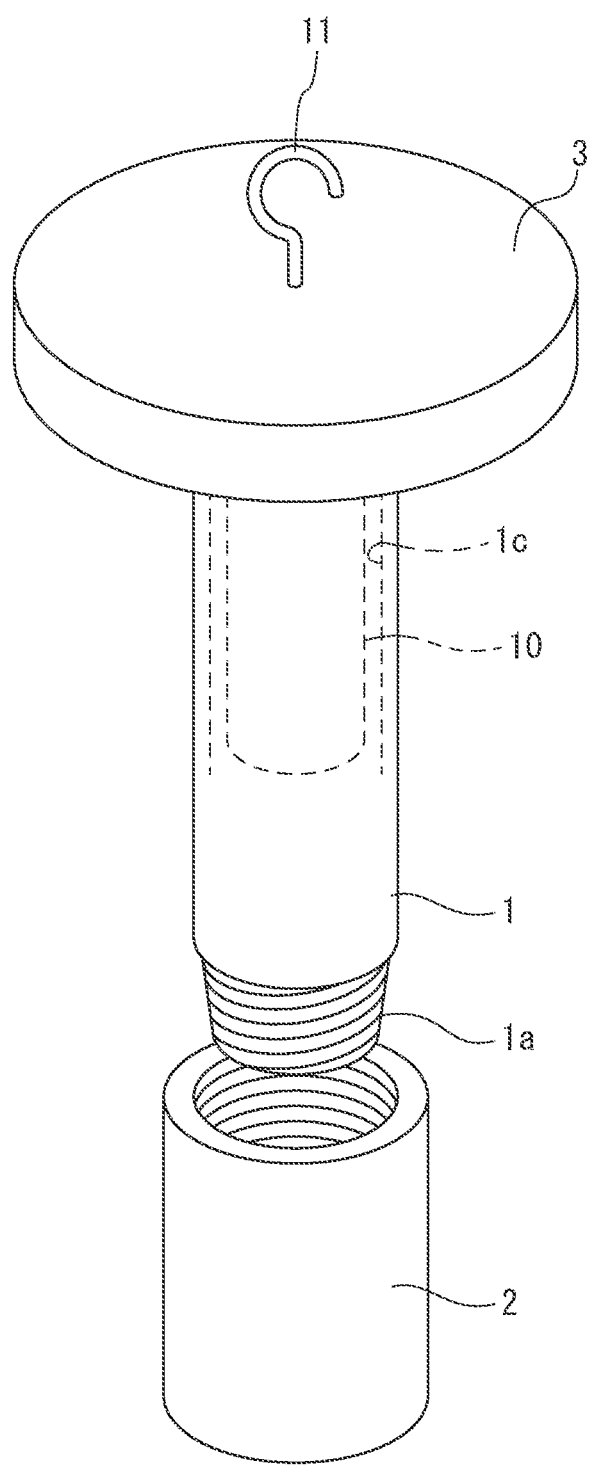
FIG. 6 is a diagram for explaining an example of attaching a weight to an upper portion of a pin.

In Attaching Example 3, as illustrated in FIG. 6, the insert rod 10 is provided to the lower surface of the weight 3 formed by a disc-shaped plate member. The other configuration is the same as Attaching Example 2.

Any attaching method may be employed for attaching the weight 3. As long as the weight 3 with necessary mass can be attached to the upper portion of the pin 1 for test, the weight 3 may be attached to the upper portion of the pin 1 by another known method.

In this event, preferably, as in Attaching Examples 1 to 3, the weight 3 is attached to the upper portion of the pin 1 so that, in response to swinging around of the pin 1, the position of at least the weight 3 is also displaced (rocks) in the lateral direction (the radial direction of the pin) with respect to the pin 1.

As described above, in these examples, the applied load to the female thread 2a by the weight 3 can be changed safely and simply according to the swinging around of the pin 1. When it is made possible to severely evaluate the seizure due to slight backlash of the weight 3 as described above, it is preferable to satisfy the following conditions.

(1) The weight 3 has a left-right front-back symmetrical shape.
(2) In the type in which the weight 3 is attached to the pin in an inside insert way (Attaching Examples 2 and 3, etc.), a margin of 20 mm or more (a margin between the outer diameter of the insert rod 10 and the inner side of the pin) is provided.

Herein, a specific description will be given by taking as an example the case where the attaching by the insert rod 10 as in Attaching Example 2 is employed as the attaching method of the weight 3.

In order to realize the weight of an actual pin (an evaluation target pin) using the weight 3, a cylindrical iron ingot corresponding to a necessary load is cut out as the weight 3. A billet before seamless rolling may be diverted for the cylindrical iron ingot, for example.

Further, as the insert rod 10, a small-diameter cylindrical iron ingot is prepared and cut to a length that is 70 to 80 percent of the length of the pin 1 for test. The insert rod 10 may be a tubular form (steel pipe). A thin billet before seamless rolling may be diverted for the small-diameter cylindrical iron ingot, for example.

Then, an upper end face of the insert rod 10 is joined to a central portion of a lower surface (bottom surface) of the cylindrical weight 3 by welding. The method of joining the insert rod 10 to the lower surface of the weight 3 is not limited to the welding, and another known joining method may be employed.

A hanging metal fitting is fixed to a central portion of an upper surface of the weight 3 by welding.

Herein, in order to make it possible to evaluate threaded joints of different sizes, it is preferable to prepare a plurality of kinds of weights 3 with various outer diameters and masses.

Figure 7:
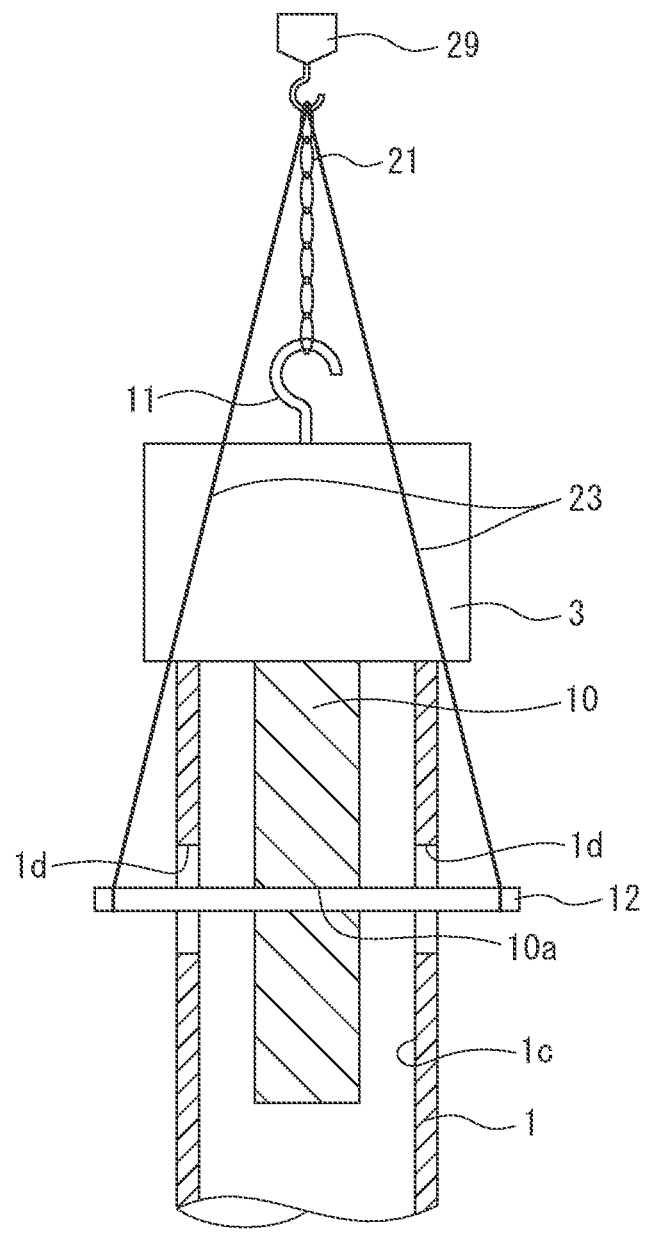
FIG. 7 is a diagram illustrating the relationship between an insert rod and a penetration rod, and a pin.

In this embodiment, as illustrated in FIG. 7, the insert rod 10 is formed with a through-hole 10a passing through the insert rod 10 in the radial direction (the lateral direction). The through-hole 10a has a diameter that allows a penetration rod 12 to pass through. Further, the pin 1 for test is formed with passing holes 1d. The passing holes 1d are provided at positions where when the insert rod 10 is inserted from the upper side of the pin 1 so that the weight 3 is placed on the upper end of the pin 1, the through-hole 10*a* formed in the insert rod 10 can be viewed in the lateral direction. The passing holes 1*d* are formed at two portions that are axially symmetric with respect to the pin 1. In a test, the penetration rod 12 is made to pass through the through-hole 10*a* from one of the passing holes 1*d* toward the other passing hole 1*d*. The penetration rod 12 has a length such that both end portions of the passing-through penetration rod 12 protrude to the outside from the passing holes 1*d*, respectively.

Figure 8A:
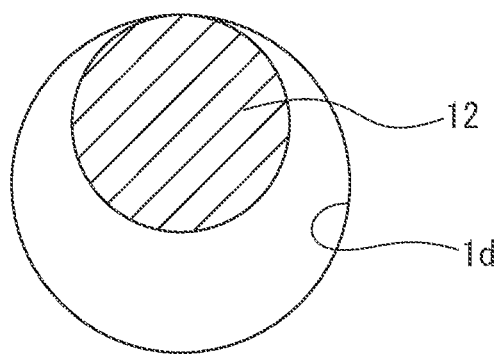
FIGS. 8A and 8B are diagrams illustrating the relationship between a penetration rod and a passing hole.
Figure 8B:
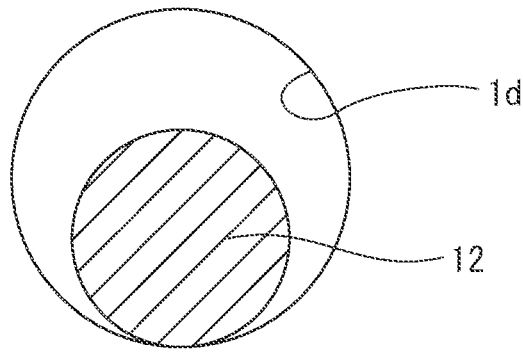

As illustrated in FIGS. 7 and 8, the passing hole 1*d* has a size that allows the passing-through penetration rod 12 to be displaceable vertically. The passing hole 1*d* may be circular or may be a long hole with its long axis directed vertically, or the like. In FIG. 7, in the state where the weight 3 is placed on the upper end of the pin 1, the penetration rod 12 is illustrated at the middle positions of the passing holes 1*d*, but not limited thereto. For example, the state of FIG. 8B has no problem. The state where a chain 21 for suspending the weight itself and a separate sling 23 hung on the penetration rod are respectively separately hung on a hook 29 of an overhead crane and are applied with tension is set as an initial position.

A large-diameter member such as a nut member with a diameter greater than the small diameter of the passing hole 1*d* may be attached to both end portions or one of the end portions of the penetration rod, thereby using it for preventing coming-off of the penetration rod 12.

In this way, with the penetration rod 12 passing through the insert rod 10 via the passing holes 1*d*, the attaching of the weight 3 becomes more stable.

The penetration rod 12 is displaceable vertically in the passing holes 1*d*. This displacement amount in the vertical direction is set to be equal to or greater than the downward displacement amount of the pin 1 by make-up, for example. The displacement amount is 10 mm or more and 50 mm or less, for example.

Further, as a slight mass adjustment (in a direction to increase the weight), a mass adjustment (increment of the mass) of the weight 3 may be performed by further setting a weight on the side where the hanging metal fitting of the weight 3 is provided. There is no limitation to the weight adding method, and the hooking type or the ring type may be employed.

(Application Method of Weight 3 and Load Reduction Method)

Practically, the application method of the weight 3 is configured such that, in order to prevent the excessive unbalance of the load to the pin 1, the hanging metal fitting 11 provided to the weight 3 itself and the penetration rod 12 passing through the insert rod 10 attached to the weight 3 are lifted together (see FIG. 7). For example, the slings 21, 23 such as the sling and the chain with their upper end portions attached to the crane are hung on the hanging metal fitting 11 and both end portions of the penetration rod 12, and the slings 21, 23 are loosened so that the load is applied to the female thread 2*a* side. Assuming the worst status that the balance is lost, it is preferable to devise to prevent the weight 3 itself from falling down.

For example, as illustrated in FIG. 7, the hanging metal fitting 11 as a hooking metal fitting is attached to the central portion of the upper end face of the weight 3 by welding or the like. As the hanging metal fitting 11, it is preferable to use a hooking metal fitting (Swivel) of the type that can turn to eliminate distortion. The sling 21 such as the chain is hung on the hanging metal fitting 11, and further, the sling 21 is attached to the hook 29 of the overhead crane 20, for example. According to the tension condition and the loose condition of the sling 21 such as the chain (hereinafter also referred to as the chain 21), it can be easily determined whether or not the load of the weight 3 is applied.

From this state, the power tongs 4 are driven to perform make-up of a threaded joint make-up/break-out test. Then, when the male thread 1*a* moves in a direction of make-up, since the position of the male thread 1*a* (the position of the pin 1) moves downward, the male thread 1*a* moves in a direction in which the tension is applied to the chain 21 hung on the weight 3 and the sling 23 such as the sling. In the status where the tension is applied, there can occur a situation where the load from the pin 1 is lightened, and therefore, in the state where the sling 23 is hung on the penetration rod 12 for preventing the falling-down of the weight 3, it is desirable to apply the load from the pin 1 including the weight 3 to the female thread 2*a* side while confirming that the sling 23 and so on are loose (confirming that the stress is applied).

In this embodiment, in the case where use is made of the insert type weight 3 with the insert rod 10 inserted, in order to avoid an accident such as the falling-down of the weight 3, the sling connected to the weight 3 is hung on the crane 20 without applying the tension, to be on the safe side. A test is performed in the state where the sling 23 is further hung on both end portions of the penetration rod 12. The sling 23 attached to the penetration rod 12 is hooked on the overhead crane in the state where the tension is applied, for example. In this case, if, in order to make it possible to apply the tension to the sling 23 independently of the crane 20, the sling 23 is hung on the overhead crane with a hoisting device (winch) interposed therebetween, it is possible to easily apply the tension.

The structure is preferably such that the chain 21 hung on the weight 3 and the sling 23 hung on the penetration rod 12 are, at their other ends, hung on the hook in the upper portion of the crane independently of each other. When make-up/break-out of the connection is performed from this state, whether or not (mass of the pin+mass of the weight 3) is applied to the female thread of the box 2 can be determined by monitoring the positional relationship between the passing holes 1*d* and the penetration rod 12 in the vertical direction.

When the chain 21 is loose, this means that the load tends to be applied to the female thread side of the box 2 that is set below. In order to apply all the load (mass of the pin 1+mass of the weight 3), as illustrated in FIG. 8, an experiment may be performed by slightly moving up and down the penetration rod 12 by the crane 20 while monitoring the positional relationship of the penetration rod 12 with respect to the passing holes 1*d*. For example, FIG. 8A illustrates a state where the load is applied to the crane (a state where all the load is not applied to the female thread of the box), and FIG. 8B illustrates a state where the load is not applied to the crane (a state where all the load is applied to the female thread of the box).

It is assumed that the hanging position by the crane 20 is fixed as illustrated in FIG. 7 to start make-up of the connection. A state is provided where the penetration rod 12 is not in contact with either an upper end opening portion or a lower end opening portion of each of the passing holes 1*d*, and the sling 23 attached to the penetration rod 12 has no looseness. From this state, as the connection are made up, the position of the pin 1 is lowered so that the position of the passing hole 1*d* is displaced downward, but the position of the penetration rod 12 does not change. Therefore, the position of the penetration rod 12 moves upward with respect to the position of the passing hole 1d. Then, when the penetration rod 12 comes in contact with a 12 o'clock position (the upper end position of the opening) of the passing hole 1d (see FIG. 8A), it is seen that the stress by the weight 3 is not completely applied to the female thread side. Then, it is possible to know that the position of the integrated weight 3 needs to be lowered. While the position (tension condition) of the chain 21 is also slightly changed, monitoring by the positions of the passing hole 1d and the penetration rod 12 makes it possible to better maintain the load application to the female thread 2a under a severe condition. The position to which the crane is lowered may also be confirmed in such a way that the penetration rod 12 is in contact with a 6 o'clock position (the lower end position of the opening) of the passing hole 1d (see FIG. 8B), and that the sling hung on the penetration rod 12 is not loose. When applying the load at the time of make-up the connection, by monitoring the position of the penetration rod 12 with respect to the passing hole 1d, it is possible to always confirm safely and surely that the intended load is applied.

Herein, with respect to an exact status of load ON/OFF (load ON: load application, load OFF: load removal) at the time of make-up/at the time of break-out, which is a subject of the present disclosure, a description will be added. When the chain 21 is loosened, the weight of the pin 1 for test and the weight of the weight 3 are all applied to the box 2 (coupling) located in the lower portion. To be exact, the state is such that the weight including all the weight of the penetration rod 12, all the weight of the hanging metal fitting 11, and the weight of a part of the sling such as the chain 21 that is placed in a loose state on the upper portion of the weight 3 when the chain is loosened, is applied. In the present disclosure, an indication is made assuming that the weight accounting for the principal component of the weight of the short pin 1 for test, the weight of the weight 3, and so on is applied. This means the load that is applied.

On the other hand, a "load removal state" referred to in the present disclosure caused by the tension of the chain 21 represents a state where, ideally, all the weight including the weight of the pin 1 for test and the weight of the weight 3 is not applied to the box 2 (coupling) located in the lower portion. That is, it represents a state of the applied load being zero. However, it is difficult to constantly maintain it in a test. This is because the position of the pin 1 for test rises according to loosening.

Therefore, the "load removal state" referred to in the present disclosure is defined as follows. That is, the range from the state of the applied load being zero until the weight corresponding up to 2 m of the pin 1 for test is applied is defined as the "load removal state". The meaning of 2 m is such that, in the case where the length of the pin 1 for test is set in a range from 600 mm to 2 m, as described in Examples given below, 2 m is determined from the upper limit of the length effective for loosening in the "load removal state" at the time of loosening.

As illustrated in FIG. 8, a determination thereof is easily made possible based on the positional relationship of the penetration rod 12 with respect to the passing hole 1d. It can be realized by performing a test while controlling the penetration rod 12 not to contact the 6 o'clock position, and as soon as the penetration rod 12 contacts the 6 o'clock position, returning the penetration rod 12 to the 12 o'clock position.

It is also possible to perform monitoring using a crane weight scale. The crane weight scale is hooked on the overhead crane, and the chain 21 is set so as to be hooked on a lower portion of the crane weight scale. The weight of the weight and the short pin 1 for test being integrated together is measured by the crane weight scale before a test. At the time of loosening, the difference from a value of the crane weight scale corresponds to all the weight applied to the box (coupling) located in the lower portion. Even when the chain 21 is tense, this does not mean that all the weight of the weight and all the weight of the pin 1 for test are lifted. Even in a state where only a part is lifted, the chain is in a state of being applied with tension, and therefore, the "load removal state" is grasped by the method described above.

As described above, "to remove the applied load" represents an adjustment (control) to provide a state where the weight of the pin 1 for test and the weight of the weight 3 are not applied to the box 2 side. In this example, in the control to remove the applied load, a state is also included where the load applied to the box 2 side is not actually zero. (Initial Set Position of Pin)

In this embodiment, the position of setting the male thread 1a of the pin 1 for test with respect to the female thread 2a of the box 2 is also important.

In this embodiment, the state where a backlash of the thread portion is intentionally provided in the state where the load is applied to the upper portion of the pin 1 for test by the weight 3 is set as an initial set position (make-up start position) before make-up. By make-up the connection using the power tongs 4 from the initial set position, it is possible to simulate an actual connection make-up condition. That is, in this embodiment, the pin is intentionally set at a position not tightened to a tightening position by hand.

There are cases where setting is performed using the weight 3 and the pin 1 already integrated together at this stage. Alternatively, there are cases where the weight 3 is set later. In the case of the former, at a setting time described below, setting is performed in a status where the weight-pin integral type is suspended by the crane or the like so that the load of the weight is not applied. In the case of the latter, the pin 1 is inserted into the box 2 and set to a position described below. At the beginning of make-up, the pin 1 may be fixed using a stabbing guide.

In this embodiment, the initial set position at the time of make-up in a make-up/break-out test using the power tongs 4 is set to a state where, after inserting the male thread 1a into the female thread 2a in such a way as to prevent the occurrence of misaligned engagement, the connection is tightened by hand so that the threads are engaged to a degree that even if the pin 1 is pulled (the pin 1 is raised upward), the pin 1 does not come off. Specifically, the initial set position is set to a position where five crests of the pin or ¼ of all crests of the pin, whichever is greater, or more are left from the upper end face of the box 2 (coupling end face).

The reason for employing such a loose initial set position at the time of make-up is to simulate a severe condition by realizing a backlash at the time of performing Make & Break.

Herein, if tightening by hand is performed to a position where one to three crests are left, it is not that a backlash is simulated. In the case where the status is such that the make-up is completed by another one to three turns, the connection is only made up while the pin is lowered directly below. In this case, the status where the pin connection locally abuts on the coupling connection (the female thread 2a of the box 2) at the time of make-up, which is likely to occur in an actual well, is hard to occur, and therefore, the pin connection is made up while uniformly abutting on the coupling connection (the female thread 2a of the box 2).

Conversely, when the male thread 1a is only inserted into the female thread 2a, cross threading (step-misaligned make-up of threads) can occur at the time of Make & Break. Therefore, there is a risk that a make-up/break-out test for the intended purpose is not resulted. In the status where a Dry film formed on the thread surface is broken or the crest itself is damaged due to the cross threading, it is likely that the lubrication characteristics of the Dry film cannot be evaluated. Therefore, the number of crests to be left in the initial set position before make-up is preferably set to be equal to or less than ⅔ of the number of all crests. An evaluation may be performed including the concern about cross threading, and therefore, the condition of only inserting the male thread 1a into the female thread 2a is also included in this application.

(Method of Performing Make-Up/Break-Out Test while Applying Weight 3)

In this embodiment, actual Make & Break can be ideally simulated by taking into account not only the applied load by the weight 3, but also a backlash at the time of make-up/loosening of the pin 1.

A description will be given of a state where make-up in an actual well is simulated.

FIG. 9 is a schematic diagram in which Make & Break with a single pin is simulated. In this case, as is often in an actual well, in most cases, a compensator 33 and a pin 30 are suspended by a crane 32 to set the pin 30, taking into account that the pin 30 is directed straight to a female thread of a box 31.

As illustrated in FIG. 10, when the compensator is not used, the tendency is high that the pin 30 is set obliquely to the box 31, and therefore, the status of Make & Break becomes severe. In the initial stage of make-up and in the late stage of break-out, the male thread and the female thread locally abut or do not abut on each other so that uniform load is not applied, but strong load is applied only to a part, thus resulting in a severe status.

In the case where the coupling 31 (*box*) and the pin 30 are tightened to a temporary tightening position by hand or the like, it is rare that the pin 30 stands upright from that position. When looking up from below, it is possible to visually confirm that the pin 30 is bent (see FIG. 11A illustrating exaggeratedly). In the case where a pin 30 formed by connecting two or more pins is made up, in most cases, the inclination direction is changed at a position of a coupling 30c between pins 30a, 30b so that complementarily, the pins 30a, 30b are disposed with slight bendings being opposite to each other (see FIG. 11B illustrating exaggeratedly). Consequently, when an actual pin is made up, a backlash often occurs. Note that "oblique setting" or "bending" referred to herein does not mean that the axis of the pin is inclined by as much as 5 degrees to 10 degrees, but means a status where the pin is bent in an elastic range. The angle thereof is slight, and it represents a state where, when looking up from below, the pin is seen to be gradually bent.

Figure 12:
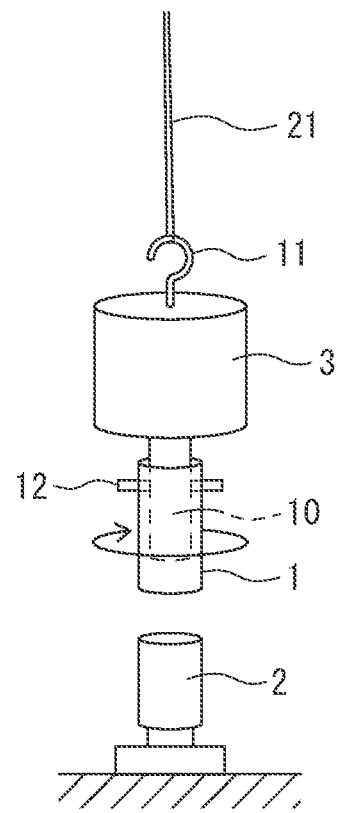
FIG. 12 is a diagram illustrating a pin in a test.

For this reason, the male thread and the female thread locally abut or do not abut on each other in the initial stage of make-up and in the late stage of break-out. Therefore, uniform load is not applied to the male thread, but strong load is applied only to a part, thus resulting in a severe status. A backlash causes the application of the large load from the pin and the application of an offset load due to the male thread being not uniformly made up to locally contact around. As illustrated in FIG. 12, when simulating this status using the short pin 1 with the weight 3, the make-up position of the pin 1 is set to be loose so as to prevent complete tightening by hand, thereby performing the simulation in this embodiment. Taking into account the state where the large load assumed in an actual well is applied, it is rare that the load uniformly acts on the threaded joint portions at the time of make-up/break-out, and therefore, it is necessary to assume a status where the offset load is applied due to local contacts. The present disclosure intentionally creates this severe application state to perform a simulation.

Herein, when the length of the pin 1 for test is 3000 mm or more and 5000 mm or less, it is preferable to perform with the weight load being applied both at the time of make-up (at the time of Make-up) and at the time of loosening (at the time of Break-Out). This application method is very similar to a status performed in an actual well, but there is a little different portion. It is that the effects of the large load and the offset load are realized by setting, at the pin end portion, the weight 3 equal to or greater than a weight corresponding to the pin raw pipe of 8 m, and by setting the initial set position in the prescribed range.

On the other hand, when a shorter short pin with a length of 600 mm or more to 2000 mm is used as the pin 1 for test for handling a test more easily, it is possible to realize the effects of the large load and the offset load by applying the weight load at the time of make-up (at the time of Make-up) and by applying no load or reducing the load at the time of loosening (at the time of Break-Out).

At the time of loosening (at the time of Break-Out), suspending the weight 3 in a direction in which the weight 3 is not applied, and the application of the offset load have a correlation with the pin length. While there is a tendency to correlate with the pin length, when Break-Out is performed with the load being applied to the pin with the weight 3, there is a tendency that when the pin is short, the pin rises straight upward without a backlash. That is, it is presumed that the application of the weight 3 rather provides a balancer so that the connection is loosened without a backlash. In this case, the offset load is not simulated. On the other hand, when the pin is long, the pin tends to bend since the pin itself is long, and therefore, even when the connection is loosened while the load of the weight 3 is applied, the conditions of the backlash and the offset load are simulated.

With a shorter short pin, in order to generate a backlash when loosening the pin 1, the weight 3 is suspended from above to loosen the pin 1, which makes it possible to realize it. Performing a test while lifting the weight 3 so as not to apply the weight 3 at all is defined as a load zero condition (ideal weight load zero condition), and slightly suspending the weight 3 is defined as a maximum load condition. When loosening is performed in this range, a backlash can be simulated. As a result of confirmation using the temperature actually felt by touching with hand, the temperature is higher when Break-Out is performed by suspending the entire pin including the weight 3, than a state where the pin load including the weight 3 is all applied to the female thread 2a. From this fact, there is no doubt that the sliding properties are changed by a backlash to adversely affect a film of the surface, a compound, and so on contributing to the lubrication.

Herein, as illustrated in FIG. 1, the position where torque is applied to the pin 1 by the power tongs 4 is a position below the load position to the pin 1 by the weight 3. The make-up/break-out of the joint in the threaded joint for oil country tubular goods make-up/break-out test is performed by the vertical type power tongs 4. The drive of the power tongs 4 is often performed by computer control similar to that used in an actual well, for example. A method that makes up by hand is also included in the present disclosure.

(Others)

In this embodiment, the following configurations can also be employed.

(1) This embodiment is a make-up/break-out evaluation method configured to perform make-up/break-out by power tongs with respect to a threaded joint for oil country tubular goods including a box having a female thread and a pin having a male thread, wherein the make-up/break-out evaluation method includes: when performing a make-up/break-out test with respect to the threaded joint for oil country tubular goods formed by attaching a lower portion of the pin to an upper portion of the box placed with an axis directed vertically, using, as the pin for use in the test, a pin for test formed by a pin shorter than an evaluation target pin; attaching a weight to an upper portion of the pin for test and setting a mass of the weight to be equal to or greater than a mass obtained by subtracting a mass of the pin for test from a mass of the evaluation target pin; and setting an initial set position to a state where five crests of the pin for test or ¼ of all crests of the pin for test, whichever is greater, or more are exposed from an upper end face of the box, the initial set position being a make-up start position before make-up, the make-up configured to make up the pin for test by the power tongs.

For example, the mass of the weight is set to a mass of the evaluation target pin with a length equal to or greater than 8 m.

Further, for example, the length of the pin for test is set in a range from 600 mm or more to 5 m or less.

According to this configuration, it is possible to provide a make-up/break-out evaluation method that makes it possible to evaluate the seizure resistance of a threaded joint for oil country tubular goods accurately without performing a test using a threaded joint with an actual length.

That is, even when the pin shorter than the evaluation target pin is used as the pin for test, by applying the load corresponding to the evaluation target pin to the upper portion of the pin and setting the initial set position before make-up to be looser than conventional intentionally, in this embodiment, the make-up is performed while the thread is swinging around so that the make-up is performed under a condition close to an actual well condition.

As a result, one aspect of the present invention is aimed at an evaluation method for evaluating/estimating the presence/absence of the seizure and the lubrication characteristics in an actual well by adding ingenuity based on the conventional laboratory-level facilities. One aspect of the present invention relates to an evaluation method for determining whether or not the design and the surface treatment and lubrication of a threaded joint are suitable for use conditions in an actual well, and it can be determined that, under a condition that a pass is determined in a test based on one aspect of the present invention, the threaded joint has no trouble of the seizure, has sufficient lubrication, and is applicable in the actual well.

(2) In this embodiment, the break-out is performed by reducing an applied load to the female thread of the box from at least the weight out of the weight and the pin for test.

For example, the break-out is performed while controlling the applied load, which is applied to the female thread of the box from the weight and the pin for test, to be in a load removal state (e.g. adjusting (controlling) to zero).

According to this configuration, at the time of break-out using the power tongs, by reducing the load intentionally, and where possible, by applying almost no load so as to provide a state where the pin easily swings around, the condition in the actual well can be simulated more accurately.

As a result, according to this configuration, the seizure resistance of the threaded joint for oil country tubular goods can be evaluated more accurately.

In this case, for example, even when the length of the pin for test is shortened to a range, for example, from 600 mm or more to 2 m or less, the evaluation can be performed accurately.

In the case where the applied load that is applied to the female thread of the box is not reduced at the time of break-out, it is preferable to increase the length of the pin for test to 3 m or more and 5 m or less.

(3) In this embodiment, a lifting device is provided that can lift at least the weight out of the weight and the pin for test, and the applied load to the female thread of the box from the weight and the pin for test is adjusted (controlled) by lifting by the lifting device.

According to this configuration, for example, the state of load application from the weight to the female thread via the pin can be adjusted.

The lifting of the pin, itself, helps make the pin unstable.

(4) In this embodiment, the weight is placed on an upper end of the pin for test, the weight includes an insert rod extending downward from a lower surface of the weight and loosely inserted in the pin for test, the weight includes a penetration rod protruding laterally from the insert rod and protruding outward through a passing hole formed in the pin for test, and the diameter of the passing hole is greater than the diameter of the penetration rod.

According to this configuration, the weight can be swingably attached to the upper portion of the pin, and further, by lifting the weight, the pin can also be lifted. That is, it is possible to configure that the load to the female thread by the pin can also be reduced.

(5) This embodiment is a method of manufacturing a threaded joint for oil country tubular goods including a box having a female thread and a pin having a male thread, wherein the method performs a make-up/break-out test by the above-described make-up/break-out evaluation method with respect to an evaluation target pin being a candidate to be employed, and determines a structure of the threaded joint for oil country tubular goods from an evaluation based on the test.

In this event, for example, the evaluation is at least one of a shape design of a connection for oil country tubular goods and a lubrication condition (a condition, such as lubrication physical property, lubrication material, surface treatment, or lubricant, to be employed) for use in the threaded joint for oil country tubular goods.

According to this configuration, even when the short pin is used in the test, it is possible to obtain an evaluation equivalent to a test using the evaluation target pin. As a result, it is possible to manufacture the threaded joint for oil country tubular goods more accurately.

EXAMPLES

Next, Examples of this embodiment will be described.
(Determination Criterion of Make-Up/Break-Out Test and Pass Determination Criterion by Number of M/B Times)

The number of M/B times is the number of times of Make & Break, and herein, is indicated by the number of times of make-up.

First, a determination criterion of a make-up/break-out test and a pass determination criterion by the number of M/B times in this Example will be described.

There are two determination criteria in a lab lubrication test of a connection for oil country tubular goods of this example. Those are a pass/fail determination by the number of M/B times along with a determination of a surface state, and a determination based on a test using an actual-length pin.

The former is pursuant to the API 5C5 standard, and, in the casing application, achievement of three times or more in terms of the number of times of Make & Break is a pass determination. In the tubing application, achievement of ten times or more, and simultaneously, no seizure and no flaw on a metal portion of the surface of a coupling or a pin are required. Note that the casing application and the tubing application cannot be distinguished from each other uniformly by the outer diameter size because it depends on the design of a well which an oil maker drills. Therefore, in the present disclosure, assuming that the size of 7" or less is regarded as the tubing size, and the size exceeding 7" is regarded as the casing, a discussion will be given below.

No seizure and no flaw represent not being subjected to so-called Galling (galling). A solid lubricating film is reduced by itself or shaved off, and then this portion is attached again or formed again at the time of make-up/break-out so as to be able to achieve lubrication. Therefore, it is unavoidable that the solid lubricating film is partially peeled off or shaved off, and thus the peeling or the like of the solid lubricating film does not affect a pass/fail determination. A status where the metal surface of a coupling (box) or a pin is flawed by visual check, a status of being fluffy, or a status where metal on the surface is crushed and deformed, is determined as a fail even when Make/break is achieved. Further, when a flaw to a degree that may cause a cut is recognized by palpation by bare hand or with a glove after visual check, it is also determined as a fail. On the other hand, the formation of a burnish (burnish, gloss) like product on a seal portion is a sign that the lubrication is good, and therefore, care should be taken not to determine it as a fail. This is a pass determination.

The latter is determined based on a deviation condition between the result of a make-up/break-out test using an actual-length pin and an evaluation of a test in a lab using a short pin. It is indicated that the smaller the deviation, the higher the accuracy of the evaluation of the test in the lab using the short pin.

Example 1

Example 1 is an example that indicates that a make-up/break-out test in the state where the mass of a weight is applied to a female thread via a pin based on the present disclosure can simulate Make & Break with an actual-length pin. Herein, the attaching of the weight employs the type of "Attaching Example 2" as illustrated in FIG. 7, in either case. This also applies to the other Examples.

Test conditions of samples (C-1 to C-4) and evaluation results thereof in Example 1 are shown in Table 1.

Herein, while the number of M/B times is indicated as a determination criterion in Table 1, there was no sample that was particularly determined to be NG only by a Galling determination. That is, there was no sample that was determined to be NG by a Galling determination even when Make/break was achieved in association with the number of M/B times. Therefore, in the Examples described below, a determination was made simply by the number of M/B times.

Herein, "(total load)" in Table 1 corresponds to a load applied to a female thread portion of a coupling. This also applies to the other tables.

TABLE 1

| sample No. | pin size | material | surface treatment of coupling | surface treatment of pin | length of pin | compound | pin set position before make-up |
|---|---|---|---|---|---|---|---|
| C-1 | 9⅝" 43.5# | L80 | Mn phosphate + solid lubricant (3) | anticorrosive paint after shot blast | short pin 2,000 mm | (not used) | loosely tightened by hand (5 pin threads exposed) |
| C-2 | 9⅝" 43.5# | L80 | Mn phosphate + solid lubricant (3) | anticorrosive paint after shot blast | short pin 3,000 mm | (not used) | loosely tightened by hand (8 pin threads exposed) |
| C-3 | 9⅝" 43.5# | L80 | Mn phosphate + solid lubricant (3) | anticorrosive paint after shot blast | short pin 5,000 mm | (not used) | loosely tightened by hand (5 pin threads exposed) |
| C-4 | 9⅝" 43.5# | L80 | Mn phosphate + solid lubricant (3) | anticorrosive paint after shot blast | casing application Range-3 (12 m) single | (not used) | completely tightened by hand (7 pin threads exposed) |

| sample No. | test type | weight (load and shape) | load at the time of make-up (total load) | load at the time of break-out (total load) | number of M/B times | determination by the number of M/B times |
|---|---|---|---|---|---|---|
| C-1 | vertical type | 0.5 ton load insert type | pin self-weight + weight (about 0.7 tons) | pin self-weight + weight (about 0.7 tons) | 7 times (seized in $8^{th}$ BO) | pass |
| C-2 | vertical type | 1 ton load insert type | pin self-weight + weight (about 1.2 tons) | pin self-weight + weight (about 1.2 tons) | 3 times (seized in $4^{th}$ BO) | pass |
| C-3 | vertical type | 1 ton load insert type | pin self-weight + weight (about 1.3 tons) | pin self-weight + weight (about 1.3 tons) | 3 times (seized in $4^{th}$ BO) | pass |
| C-4 | vertical type | (not attached) * example of actual-length pin | self-weight of actual-length pin (about 1.0 ton) | self-weight of actual-length pin (about 1.0 ton) | 3 times (seized in $4^{th}$ BO) | pass |

In Example 1, in C-1 to C-4 shown in Table 1, the seizure resistance was evaluated using a L80 carbon steel based material of 9⅝" 43.5 # size in JFELION™ (registered trademark). Herein, the connection designs of the respective conditions had the same structure, i.e. the same connection structure.

Specific connection design outlines in Example 1 are as follows.
(1) pin: rotational shape of composite R convex curve in section
(2) coupling: straight line shape tapered at 4.7 degrees in section
(3) seal point position: 0.31 by pin nose length ratio from pin leading end
(4) crest: 5 TPI (TPI: the number of crests per inch), 20 crests Example 1 is an example that was performed using a make-up/break-out test for evaluating a developed solid lubricant.

Herein, as lubrication on the coupling side, a solid lubricating film was formed on a Mn phosphate chemical conversion film. The solid lubricating film was formed in such a way that components containing a binder resin composed of a polyfunctional epoxy resin and a solid lubricant mainly composed of polyethylene were developed in a solvent, and after application, a film was formed at a burning temperature of 200 to 300° C. On the male thread pin side, a F-based resin film was applied after performing shot blast.

<C-4>

In C-4, an actual-length pin was used. Further, C-4 is a case where a make-up/break-out test was performed under a conventional condition in which a weight was not used and an initial set position (make-up start position) was set to a state completely tightened by hand (hereinafter referred to as the conventional position). This C-4 is an example (seizure occurred at the fourth time) in which the number of M/B times was three so that an evaluation was a pass. This was made to be a determination criterion in Example 1. Herein, the mass of the actual-length pin was about 1.0 ton (metric ton). Incidentally, the weight of a short pin is about 110 kg with a length of 1 m.

<C-1 to C-3>

C-1 to C-3 were each an example in which, based on the present disclosure, make-up/break-out by the power tongs 4 were performed in the state where an initial set position (make-up start position) was set to a state loosely tightened by hand (hereinafter referred to as the loose position), and the load was applied by a weight to a pin for test.

In each table, the initial set position (make-up start position) is indicated as "pin set position before make-up".

C-1 to C-3 were all determined as a pass like C-4.

However, C-1 is a case where the length of the pin for test was as short as 2000 mm, and the mass of the weight was also as light as about 0.5 tons. In the case of this C-1, at the time of break-out, the weight serves as a balancer so that the short pin for test rises straight upward without swinging around, and therefore, the evaluation was lenient compared to the actual state. Accordingly, C-1 is an example in which the number of M/B times was seven, which was the number of times beyond imagination. Further, C-1 is an example in which the mass in the sum of the mass of the pin for test and the mass of the weight was smaller than the mass of the actual-length pin. In this way, the deviation between the evaluation of C-1 and the evaluation of C-4 is large.

On the other hand, C-2 and C-3 are examples in which the lengths of the pins 1 for test were 3,000 mm and 5,000 mm, respectively, and are examples in which the weight 3 with a weight of about 1 ton was applied both at the time of Make-up and at the time of Break-Out.

In these C-2 and C-3, the number of M/B times was equal to that of C-4 in the case of the actual length.

These C-2 and C-3 are examples in which the length of the pin for test was equal to or greater than 3,000 mm. Further, C-2 and C-3 are examples in which the mass of the weight 3 was equivalent to the mass of the actual-length pin.

As seen from the examples of C-1 to C-3, it has been seen that, by performing the make-up/break-out in the state where the load corresponding to the mass of the actual-length pin is applied by the weight, and by setting the initial set position to the loose position, it is possible to obtain the evaluation equivalent to the evaluation in the test using the actual-length pin.

On the other hand, it has been seen that when the mass of the weight is less than the mass of the actual-length pin, the evaluation becomes lenient compared to the evaluation in the test using the actual-length pin.

Example 2

Example 2 is an example in which comparison between a horizontal type test and a vertical type test, Make/break behavior according to the presence/absence of a weight, and so on were tested. In Example 2, the length of a pin was set to an actual length, or set to be equal to or less than 1000 mm.

Test conditions of samples (A-1 to A-6) and evaluation results thereof in Example 2 are shown in Table 2.

Herein, while the number of M/B times is indicated as a determination criterion in Table 2, there was no sample that was particularly determined to be NG only by a Galling determination. That is, there was no sample that was determined to be NG by a Galling determination even when Make/break was achieved in association with the number of M/B times.

TABLE 2

| sample No. | pin size | material | surface treatment of coupling | surface treatment of pin | length of pin | compound | pin set position before make-up |
|---|---|---|---|---|---|---|---|
| A-1 | 13⅜" 72.0# | Q125 | Mn phosphate | shot blast | short pin 600 mm | API Mod compound | completely tightened by hand (2 pin crests exposed) |
| A-2 | 13⅜" 72.0# | Q125 | Mn phosphate | shot blast | short pin 1,000 mm | API Mod compound | completely tightened by hand (3 pin crests exposed) |
| A-3 | 13⅜" 72.0# | Q125 | Mn phosphate | shot blast | short pin 1,000 mm | API Mod compound | completely tightened by hand (3 pin crests exposed) |

TABLE 2-continued

| | | | | | | | |
|---|---|---|---|---|---|---|---|
| A-4 | 13⅜" 72.0# | Q125 | Mn phosphate | shot blast | casing application Range-3 (12-13 m) single * example of actual-length pin | API Mod compound | completely tightened by hand-tight (10 pin crests exposed) * A plausible position as a practical make-up position in an actual well. Since, structurally, an actual-length pin is inserted slightly obliquely, 10 crests were the limit of tightening by hand. |
| A-5 | 13⅜" 72.0# | Q125 | Mn phosphate | shot blast | short pin 600 mm | API Mod compound | loosely tightened by hand (7 pin crests exposed) |
| A-6 | 13⅜" 72.0# | Q125 | Mn phosphate | shot blast | short pin 600 mm | API Mod compound | completely tightened by hand (1 pin thread exposed) |

| sample No. | test type | weight (load and shape) | load at the time of make-up (total load) | load at the time of break-out (total load) | number of M/B times | determination by the number of M/B times |
|---|---|---|---|---|---|---|
| A-1 | horizontal type | not attached | zero | zero | 6 times stopped (≥6 times) | pass |
| A-2 | vertical type | not attached (only pin self-weight) | pin self-weight (about 110 kg) | pin self-weight (about 110 kg) | 5 times (seized in $6^{th}$ BO) | pass |
| A-3 | vertical type | 0.5 ton load insert type | pin self-weight + weight (about 0.6 tons) | pin self-weight + weight (about 0.6 tons) | 4 times (seized in $5^{th}$ BO) | pass |
| A-4 | vertical type | (not attached) * example of actual-length pin | self-weight of actual-length pin (about 1.3 tons) | self-weight of actual-length pin (about 1.3 tons) | 2 times (seized in $3^{rd}$ BO) | NG |
| A-5 | vertical type | 1 ton load insert type | pin self-weight + weight (about 1.1 tons) | zero | 2 times (seized in $3^{rd}$ BO) | NG |
| A-6 | vertical type | 1 ton load insert type | pin self-weight + weight (about 1.1 tons) | pin self-weight + weight (about 1.1 tons) | 3 times (seized in $4^{th}$ BO) | pass |

In A-1 to A-6 shown in Table 2, in order to evaluate the structure of a newly designed threaded joint, the seizure resistance was evaluated using a Q125 carbon steel based material of 13⅜" 72.0 # size. The connection designs of the samples had the same structure, i.e. the same connection structure.

Specific connection design outlines in Example 2 are as follows.

(1) pin: rotational shape of 2" R convex curve in section
(2) coupling: straight line shape tapered at 3 degrees in section
(3) seal point position: 0.25 by pin nose length ratio from pin leading end
(4) crest: 4 TPI, 18 crests

<A-4>

In A-4, an actual-length pin was used. Further, A-4 is a case where a make-up/break-out test was performed under a conventional condition in which a weight was not used and an initial set position (make-up start position) was set to a conventional position.

That is, A-4 is an example in which the seizure resistance of the new connection design was tested by preparing the actual-length pin. This becomes a determination criterion and an actual well condition. In A-4, the seizure occurred after the third break-out. An initial make-up set position was a position where 10 pin crests were exposed, which was thought to be a plausible position as a practical make-up position often observed in an actual well. Since, structurally, the actual-length pin is sometimes inserted slightly obliquely no matter how much it is devised, 10 threads were the limit of tightening by hand in the example this time.

That is, A-4 is an example in which the seizure occurred at the third time of the number of M/B times so that an evaluation was a fail. This was made to be a determination criterion in Example 2.

<A-1 to A-3>

In examples shown in A-1 to A-3, a test was performed by using a short pin as a pin for test and setting an initial set position before make-up to a conventional position completely tightened by hand. In this example, a coupling/pin axis adjustment was performed well by horizontal type tongs. Since the short pin was used, handling was easy for both the horizontal type and vertical type tongs, and therefore, it was possible to perform make-up to a degree where about two to three pin crests were exposed, i.e. to a position completely tightened by hand at a glance. Then, from that position, make-up by the power tongs 4 was performed.

A-1 is a horizontal type test and is an example in which the test was performed in the status where no load was applied to the threads at the time of make-up and at the time of break-out, and Make & Break was achieved six times. In A-1, the test was intentionally completed by 6 times of Make & Break.

According to the ISO 13679 standard, a casing member is on the pass level if M/B can be performed three times, and therefore, it is seen that it was the level exceeding it by far. That is, the deviation from the evaluation of A-4 is large.

A-2 is an example that simulates a conventional vertical type test. While A-1 was in the status where the self-weight of the short pin was not applied to the coupling connection, A-2 was in the status where since the test was performed with the pin standing upright, the self-weight of the short pin was applied to the crest of the coupling. This means a status where even the short pin has a self-weight of about 110 KG with this size, and this is applied to the coupling crest.

In the case of A-2, although the number of M/B times was reduced to five (seizure occurred at the sixth time), an evaluation of the test was a pass evaluation. The deviation from the evaluation of A-4 is large.

A-3 is an example in which NPL 2 was simulated so that a make-up/break-out test was performed by disposing a weight of 510 KG weight at an upper portion of a pin. In the case of A-3, although the number of M/B times was reduced to four (seizure occurred at the fifth time), an evaluation of the test was a pass evaluation, and therefore, A-3 is determined to be a design having the seizure resistance that satisfies the required level of API 5C5: 2017.

As described above, with the tests under the conditions of A-1 to A-3, it is estimated that the load was too light as a simulation of an actual well, and accordingly, a pass determination was made. That is, with the tests under the conditions of A-1 to A-3, since the conditions of the tests for evaluation of the seizure resistance were looser than the test with the actual-length pin, it has been seen that although it is possible to screen the adequacy of the new connection design, the tests cannot guarantee non-occurrence of the seizure in the make-up/break-out with the actual length.

<A-5>

In A-5, a short pin of 600 mm was employed as a pin for test. Then, a make-up/break-out test was performed based on the present disclosure under the condition where an initial set position (make-up start position) was set to a loose state with seven threads exposed, and a load corresponding to 1 ton (corresponding to 9 to 10 m) of a single actual-length pin was applied by a weight, with its results shown. The pin along with the weight were lifted at the time of break-out so that the applied load from the weight 3 and the pin to a female thread was controlled to near zero at the time of break-out.

In the test under the condition of A-5, it was confirmed that the number of M/B times was 2 (seizure occurred at the third time) and thus an evaluation was a fail so that the evaluation was equivalent to the actual well condition of A-4.

That is, it has been seen that the evaluation by the test under the condition of A-5 can be equivalent to the evaluation of the severe make-up/break-out test with the actual length.

<A-6>

While the condition of A-6 was similar to A-5, A-6 is an example in which make-up was started in the state where an initial set position (make-up start position) was set to a conventional position with one thread exposed.

When the initial set position (make-up start position) was set to the conventional position as in A-6, the number of M/B times was 3 (seizure occurred at the fourth time) and thus an evaluation was a pass. That is, it has been seen that when a test is performed in the state where an initial set position completely tightened by hand is set before make-up, an evaluation is made to be good so that it is not possible to simulate the actual well condition.

As described above, it has been seen that, by performing the make-up/break-out in the state where the load corresponding to the mass of the actual-length pin was applied by the weight, and by setting the initial set position to the loose position, it is possible to obtain the evaluation equivalent to the evaluation in the test using the actual-length pin.

Herein, it has been seen that, as in A-5, even when the length of the pin for test is set to as short as 600 mm, by applying the load by the weight at the time of make-up and reducing the applied load to the female thread at the time of break-out, the evaluation equivalent to the evaluation of the severe make-up/break-out test with the actual length is made possible.

Example 3

Example 3 is an example that indicates that a make-up/break-out test in the state where the mass of a weight is applied to a female thread via a pin based on the present disclosure can simulate Make & Break with an actual-length pin.

Test conditions of samples (B-1 to B-6) and evaluation results thereof in Example 3 are shown in Table 3.

Herein, while the number of M/B times is indicated as a determination criterion in Table 3, there was no sample that was particularly determined to be NG only by a Galling determination. That is, there was no sample that was determined to be NG by a Galling determination even when Make/break was achieved in association with the number of M/B times.

TABLE 3

| sample No. | pin size | material | surface treatment of coupling | surface treatment of pin | length of pin | compound | pin set position before make-up |
|---|---|---|---|---|---|---|---|
| B-1 | 9⅝" 53.5# | L80-13Cr | Cu-Sn alloy plating + solid lubricant (1) | anticorrosive paint after shot blast | short pin 1,000 mm | (not used) | completely tightened by hand (3 pin crests exposed) |
| B-2 | 9⅝" 53.5# | L80-13Cr | Cu-Sn alloy plating + solid lubricant (1) | anticorrosive paint after shot blast | short pin 1,000 mm | (not used) | loosely tightened by hand (5 pin crests exposed) |
| B-3 | 9⅝" 53.5# | L80-13Cr | Cu-Sn alloy plating + solid lubricant (1) | anticorrosive paint after shot blast | short pin 2,000 mm | (not used) | loosely tightened by hand (5 pin crests exposed) |
| B-4 | 9⅝" 53.5# | L80-13Cr | Cu-Sn alloy plating + solid lubricant (1) | anticorrosive paint after shot blast | casing application Range-3 (12 m) single | (not used) | completely tightened by hand (7 pin crests exposed) |
| B-5 | 9⅝" 53.5# | L80-13Cr | Cu-Sn alloy plating + solid lubricant (2) | anticorrosive paint after shot blast | short pin 600 mm | (not used) | loosely tightened by hand (5 pin crests exposed) |

TABLE 3-continued

| | | | | | | | |
|---|---|---|---|---|---|---|---|
| B-6 | 9⅝" 53.5# | L80-13Cr | Cu-Sn alloy plating + solid lubricant (2) | anticorrosive paint after shot blast | casing application Range-3 (12 m) single | (not used) | completely tightened by hand (7 pin crests exposed) |

| sample No. | test type | weight (load and shape) | load at the time of make-up (total load) | load at the time of break-out (total load) | number of M/B times | determination by the number of M/B times |
|---|---|---|---|---|---|---|
| B-1 | vertical type | 1 ton load insert type | pin self-weight + weight (about 1.1 tons) | pin self-weight + weight (about 1.1 tons) | 5 times (seized in 6th BO) | pass |
| B-2 | vertical type | 1 ton load insert type | pin self-weight + weight (about 1.1 tons) | pin self-weight + weight (about 1.1 tons) | 3 times (seized in 4th BO) | pass |
| B-3 | vertical type | 1 ton load insert type | pin self-weight + weight (about 1.1 tons) | zero | 2 times (seized in 3rd BO) | NG |
| B-4 | vertical type | (not attached) * example of actual-length pin | self-weight of actual-length pin (about 1.0 ton) | self-weight of actual-length pin (about 1.0 ton) | 2 times (seized in 3rd BO) | NG |
| B-5 | vertical type | 1 ton load insert type | pin self-weight + weight (about 1.1 tons) | zero | 5 times (seized in 6th BO) | pass |
| B-6 | vertical type | (not attached) * example of actual-length pin | self-weight of actual-length pin (about 1.0 ton) | self-weight of actual-length pin (about 1.0 ton) | 5 times stopped (≥5 times) | pass |

In Example 3, with respect to the samples (B-1 to B-6) shown in Table 3, the seizure resistance was evaluated using a L80-13Cr steel chrome steel based material of 9⅝" 53.5 # size in JFELION™ (registered trademark). The connection designs of the samples had the same structure, i.e. the same connection structure.

Specific connection design outlines in Example 3 are as follows.
 (1) pin: rotational shape of composite R convex curve in section
 (2) coupling: straight line shape tapered at 4.7 degrees in section
 (3) seal point position: 0.31 by pin nose length ratio from pin leading end
 (4) crest: 5 TPI, 20 crests In Example 3, an evaluation of a developed solid lubricant was performed using a make-up/break-out test.

As lubrication on the coupling side, a solid lubricating film was formed on Cu—Sn alloy plating. The solid lubricating film was mainly composed of a compound obtained by developing Teflon (registered trademark) in a polyamideimide/polyimide composite binder resin, and a film was formed at a burning temperature of 200 to 300° C. On the male thread side of a pin, after performing shot blast, water-based acrylic was applied and dried by far-infrared light to form a film.

<B-4>
B-4 is a case where an actual-length pin was used, and a make-up/break-out test was performed under a conventional condition in which a weight was not used and an initial set position (make-up start position) was set to a conventional position. This B-4 is an example (seizure occurred at the third time) in which the number of M/B times was 2 so that an evaluation was a fail. This was made to be a determination criterion in Example 3.

<B-1>
B-1 is a case where the load is applied by a weight, but an initial set position before make-up was set to a conventional position completely tightened by hand.

In a test under the condition of this B-1, the number of M/B times was 5 (seizure occurred at the six time) and thus an evaluation was determined as a pass. The deviation with respect to the evaluation of B-4 is large.

<B-2>
B-2 is an example in which the condition was the same as the condition of B-1 except that an initial set position before make-up was set to a loose position.

In B-2, by setting the initial set position before make-up to the loose position, the number of M/B times was 3 (seizure occurred at the fourth time), which was a slightly lenient evaluation compared to the evaluation of B-4 with the actual length. However, compared to B-1, the evaluation was close to the evaluation of B-4 with the actual length.

<B-3>
B-3 is an example in which, compared to B2, a pin for test was set to 2000 mm, and the condition was changed to a condition to reduce the applied load at the time of break-out.

In B-3, a test was a severe test in which the weight 3 with a sufficient weight was applied, and a backlash was generated at the time of make-up/break-out, wherein the seizure occurred on the third time in a make-up/break-out test so that a fail was determined. That is, the evaluation was equivalent to the number of M/B times being two in B-4, and therefore, it has been seen that it is possible to obtain the evaluation equivalent to the evaluation in the test using the actual-length pin.

While the evaluation was a pass in B-2, compared to B-1 in which the initial set position was set to the conventional position, the evaluation of B-2 was approximate to the evaluation of B-4. It has been seen that the evaluation accuracy is improved by applying the load by the weight 3 and setting the initial set position to the loose position.

<B-6, B-5>
B-6 is an example in which a make-up/break-out test was performed under the same condition as B-4 except that use was made of a solid lubricant that was further improved with respect to a solid lubricant that was determined as a fail in the evaluation of B-4. In an evaluation by the condition of this B-6, the number of M/B times was 5 or more so that the evaluation was determined as a pass. Further, as B-5, a test was performed under the condition of B-3 except that the solid lubricant used in B-6 was used, and as a result, the number of M/B times was 5 so that an evaluation was determined as a pass.

As described above, it has been seen that even when a pin shorter than an actual length is used as a pin for test, it is possible to evaluate the seizure resistance more accurately than conventional by performing a test based on the present disclosure.

In the Examples described above, the cases that are configured by the examples on the large diameter side are shown by way of example, but it is estimated that the present disclosure can obtain similar effects regardless of the conditions such as the outer diameter, thickness size, and the steel type.

The entire contents of U.S. Provisional Application No. 63/161,122 (filed on Mar. 15, 2021), to which this application claims priority, form a part of the present disclosure by reference herein. Herein, while the description has been given with reference to the limited number of the embodiments, the scope of the right is not limited to those, and modification of the embodiments based on the disclosure described above is apparent for those skilled in the art.

REFERENCE SIGNS LIST 1 pin for test
1a male thread
1c inner diameter surface
1d passing hole
2 box (coupling)
2a female thread
3 weight
4 power tongs
10 insert rod
10a through-hole
12 penetration rod
20 lifting device (crane)
21 chain (sling)
23 sling (sling)

The invention claimed is:

1. A make-up/break-out evaluation method for a threaded joint for oil country tubular goods, the make-up/break-out evaluation method configured to perform make-up/break-out by power tongs with respect to the threaded joint for oil country tubular goods including a box having a female thread and a pin having a male thread, the make-up/break-out evaluation method comprising:
when performing a make-up/break-out test with respect to the threaded joint for oil country tubular goods formed by attaching a lower portion of the pin to an upper portion of the box placed with an axis directed vertically,
using, as the pin for use in the test, a pin for test formed by a pin shorter than an evaluation target pin;
attaching a weight to an upper portion of the pin for test and setting a mass of the weight to be equal to or greater than a mass obtained by subtracting a mass of the pin for test from a mass of the evaluation target pin; and
setting an initial set position to a state where five crests of the pin for test or ¼ of all crests of the pin for test, whichever is greater, or more are exposed from an upper end face of the box, the initial set position being a make-up start position before make-up, the make-up configured to make up the pin for test by the power tongs.

2. The make-up/break-out evaluation method for the threaded joint for oil country tubular goods according to claim 1, wherein the mass of the weight is set to a mass of the evaluation target pin with a length equal to or greater than 8 m.

3. The make-up/break-out evaluation method for the threaded joint for oil country tubular goods according to claim 2, wherein a length of the pin for test is set in a range from 600 mm or more to 5 m or less.

4. The make-up/break-out evaluation method for the threaded joint for oil country tubular goods according to claim 2, wherein the break-out is performed by reducing an applied load to the female thread of the box from at least the weight out of the weight and the pin for test.

5. A method of manufacturing a threaded joint for oil country tubular goods including a box having a female thread and a pin having a male thread, the method of manufacturing the threaded joint for oil country tubular goods comprising:
performing the make-up/break-out test by the make-up/break-out evaluation method for the threaded joint for oil country tubular goods according to claim 2, and determining a structure of the threaded joint for oil country tubular goods from an evaluation based on the test.

6. The make-up/break-out evaluation method for the threaded joint for oil country tubular goods according to claim 1, wherein a length of the pin for test is set in a range from 600 mm or more to 5 m or less.

7. The make-up/break-out evaluation method for the threaded joint for oil country tubular goods according to claim 6, wherein the break-out is performed by reducing an applied load to the female thread of the box from at least the weight out of the weight and the pin for test.

8. The make-up/break-out evaluation method for the threaded joint for oil country tubular goods according to claim 1, wherein the break-out is performed by reducing an applied load to the female thread of the box from at least the weight out of the weight and the pin for test.

9. The make-up/break-out evaluation method for the threaded joint for oil country tubular goods according to claim 8, wherein:
a lifting device is provided, the lifting device configured to lift at least the weight out of the weight and the pin for test; and
the applied load to the female thread of the box from the weight and the pin for test is adjusted by lifting by the lifting device.

10. The make-up/break-out evaluation method for the threaded joint for oil country tubular goods according to claim 9, wherein the applied load to the female thread of the box from the weight and the pin for test is removed at the time of the break-out.

11. The make-up/break-out evaluation method for the threaded joint for oil country tubular goods according to claim 9, wherein:
the weight is placed on an upper end of the pin for test;
the weight includes an insert rod extending downward from a lower surface of the weight and loosely inserted in the pin for test;
the weight includes a penetration rod protruding laterally from the insert rod and protruding outward through a passing hole formed in the pin for test; and a diameter of the passing hole is greater than a diameter of the penetration rod.

12. The make-up/break-out evaluation method for the threaded joint for oil country tubular goods according to claim 9, wherein the length of the pin for test is set in a range from 600 mm or more to 2 m or less.

13. The make-up/break-out evaluation method for the threaded joint for oil country tubular goods according to claim 8, wherein the applied load to the female thread of the box from the weight and the pin for test is removed at the time of the break-out.

14. The make-up/break-out evaluation method for the threaded joint for oil country tubular goods according to claim 13, wherein:

the weight is placed on an upper end of the pin for test;

the weight includes an insert rod extending downward from a lower surface of the weight and loosely inserted in the pin for test;

the weight includes a penetration rod protruding laterally from the insert rod and protruding outward through a passing hole formed in the pin for test; and a diameter of the passing hole is greater than a diameter of the penetration rod.

15. The make-up/break-out evaluation method for the threaded joint for oil country tubular goods according to claim 13, wherein the length of the pin for test is set in a range from 600 mm or more to 2 m or less.

16. The make-up/break-out evaluation method for the threaded joint for oil country tubular goods according to claim 8, wherein:

the weight is placed on an upper end of the pin for test;

the weight includes an insert rod extending downward from a lower surface of the weight and loosely inserted in the pin for test;

the weight includes a penetration rod protruding laterally from the insert rod and protruding outward through a passing hole formed in the pin for test; and a diameter of the passing hole is greater than a diameter of the penetration rod.

17. The make-up/break-out evaluation method for the threaded joint for oil country tubular goods according to claim 16, wherein the length of the pin for test is set in a range from 600 mm or more to 2 m or less.

18. The make-up/break-out evaluation method for the threaded joint for oil country tubular goods according to claim 8, wherein the length of the pin for test is set in a range from 600 mm or more to 2 m or less.

19. A method of manufacturing a threaded joint for oil country tubular goods including a box having a female thread and a pin having a male thread, the method of manufacturing the threaded joint for oil country tubular goods comprising:

performing the make-up/break-out test by the make-up/break-out evaluation method for the threaded joint for oil country tubular goods according to claim 1, and determining a structure of the threaded joint for oil country tubular goods from an evaluation based on the test.

20. The method of manufacturing the threaded joint for oil country tubular goods according to claim 19, wherein the evaluation is at least one of a shape design of a connection for oil country tubular goods and a lubrication condition for use in the threaded joint for oil country tubular goods.

* * * * *